United States Patent [19]
Freeman

[11] Patent Number: 5,937,188
[45] Date of Patent: Aug. 10, 1999

[54] INSTRUCTION CREATION DEVICE

[75] Inventor: Daniel Kenneth Freeman, Suffolk, United Kingdom

[73] Assignee: British Telecommunications public limited company, London, United Kingdom

[21] Appl. No.: 08/737,158
[22] PCT Filed: May 16, 1995
[86] PCT No.: PCT/GB95/01097
§ 371 Date: Nov. 26, 1996
§ 102(e) Date: Nov. 26, 1996
[87] PCT Pub. No.: WO95/31779
PCT Pub. Date: Nov. 23, 1995

[30] Foreign Application Priority Data

May 16, 1994 [GB] United Kingdom .................. 9409724
Sep. 13, 1994 [EP] European Pat. Off. ............. 94306709

[51] Int. Cl.⁶ ..................................................... G06F 9/44
[52] U.S. Cl. ........................... 395/701; 395/707; 395/708
[58] Field of Search .................................... 395/701, 707, 395/709, 705, 708; 364/280.4, 280.5, 261.3, 262.4, 262.7

[56] References Cited

U.S. PATENT DOCUMENTS 5,127,091  6/1992  Boufarah et al. ................. 395/800.23
5,133,077  7/1992  Karne et al. ............................. 395/585
5,717,883  2/1998  Sager ....................................... 395/394

FOREIGN PATENT DOCUMENTS

A-0 442 624  8/1991  European Pat. Off. .
A-0 467 629  1/1992  European Pat. Off. .

*Primary Examiner*—James P. Trammell
*Assistant Examiner*—Demetra R. Smith
*Attorney, Agent, or Firm*—Nixon & Vanderhye P.C.

[57] ABSTRACT

Apparatus generates a sequence of code instructions for execution by a programmable processor to solve a problem. In includes generating a sequence of variable value data corresponding to postulate solutions to such problem; testing the postulate solution data in a relationship to determine whether or not they correspond to the solution to the problem; and, in the event that the test cannot be logically evaluated, storing data defining a decision forming part of the sequence of instruction codes, and generating a plurality of branches of the sequence to be performed depending upon the results of the decision including more than one possible branch from the decision to be taken in the event of the same outcome of the decision, and for selecting one of the branches.

16 Claims, 20 Drawing Sheets

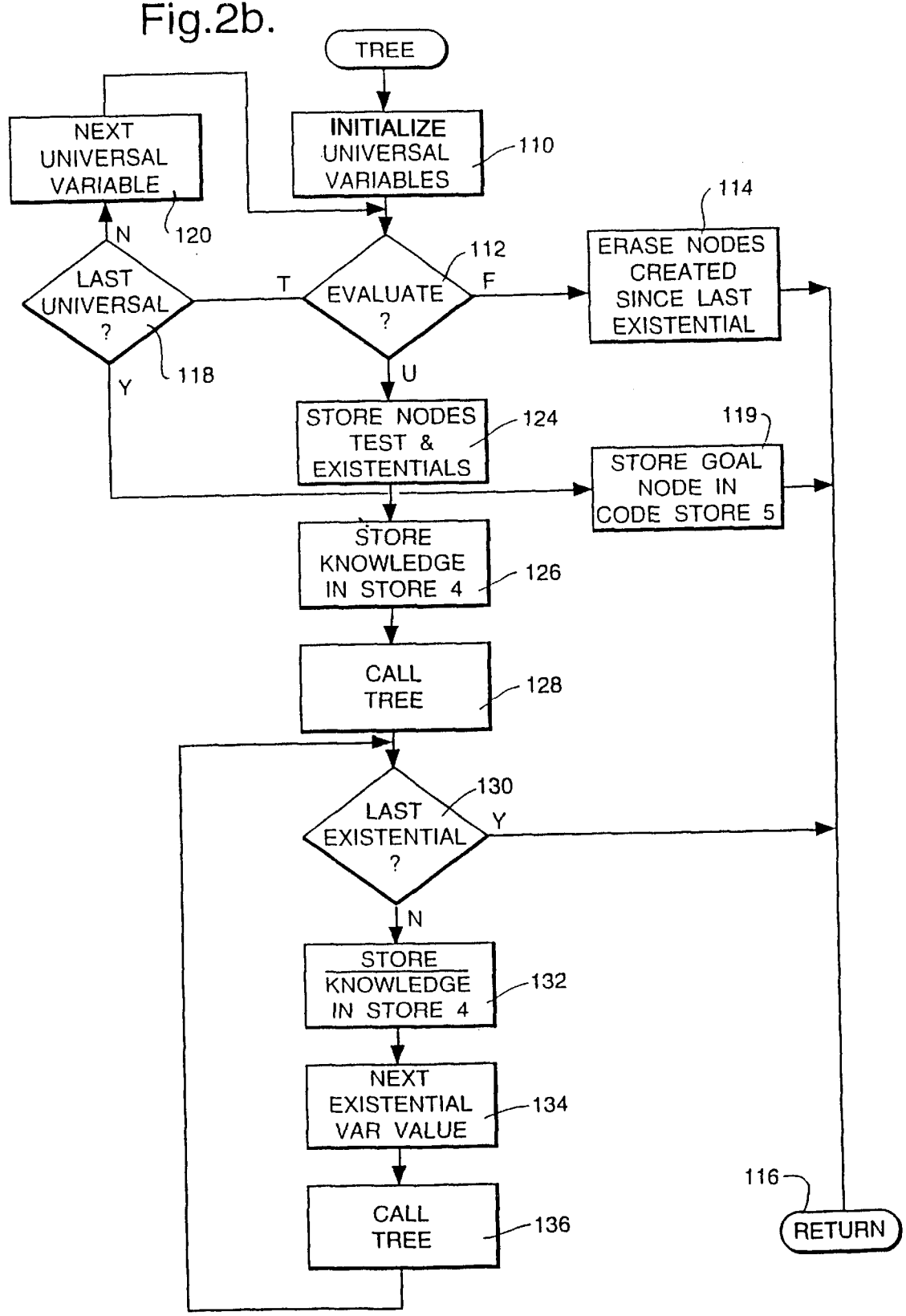

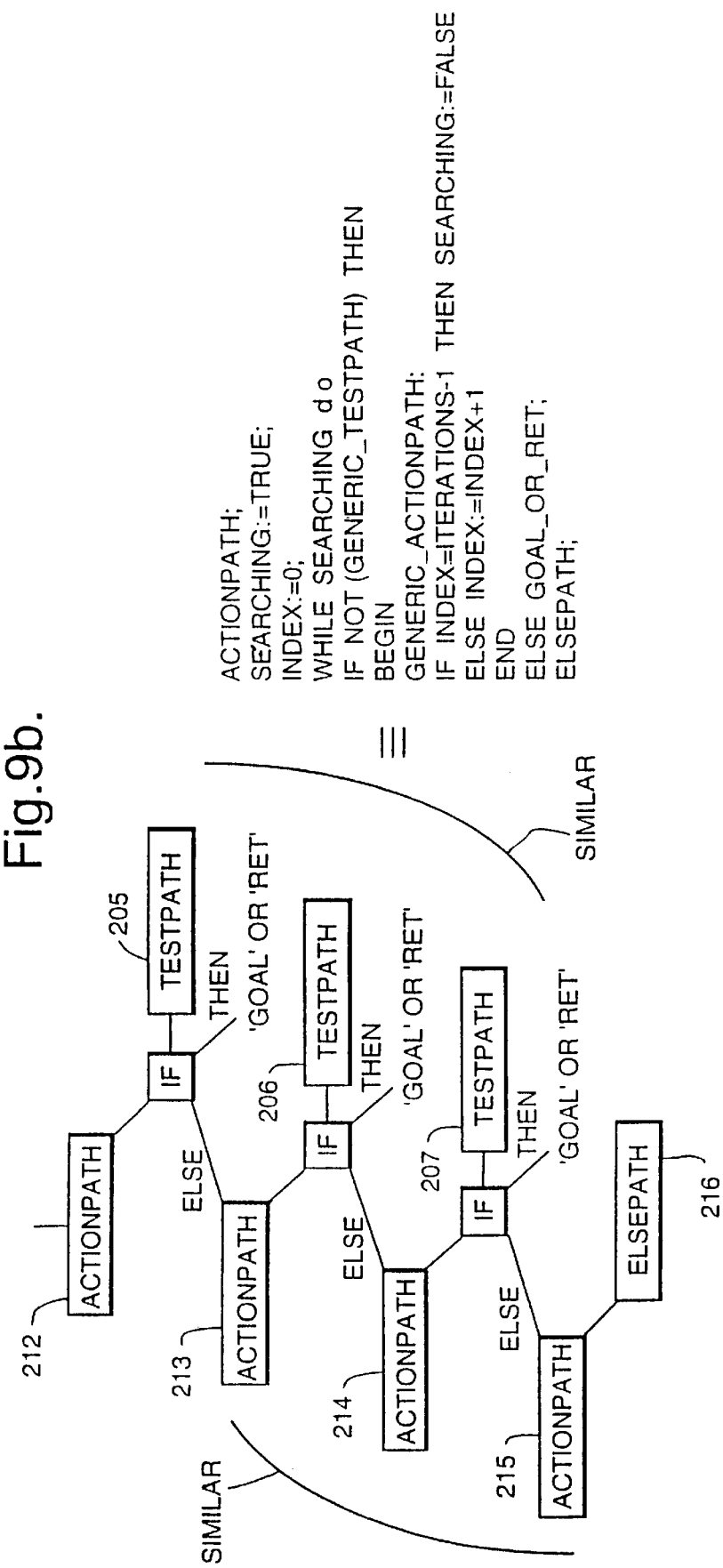

INSTRUCTION CREATION DEVICE

FIELD OF THE INVENTION

This invention relates to a device for creating a sequence of instructions for operating the same, or a different, target device.

BACKGROUND ART

It is known to provide devices for translating a sequence of instructions in a high level computer language (such as FORTRAN) into a sequence of machine level instructions for subsequent execution. Such a device comprises a programmable computer operating under control of a programme (termed a "compiler") which operates in accordance with a fixed series of rules, and may produce code which is repetitive and uses a large volume of memory, or operates slowly.

Furthermore, the high level language imposes an algorithmic structure specifying an order in which operations are to performed by the target device, which may in fact be wasteful of the memory and other resources of the device.

SUMMARY OF THE INVENTION

The technical problem addressed by the present invention is to provide a device which creates a sequence of instructions for subsequent execution which is efficient (for example in execution speed or in number of instructions and hence required memory).

Accordingly, in one aspect, the invention provides a device for creating instructions arranged to generate multiple alternative sequences of instructions performing the same function, and to select one of said sequences.

In one aspect, the device may comprise input means for accepting a function to be executed by the instructions in the form of one or more logical relationships. Alternatively, in another aspect, the device may comprise input means which can accept input from a user in the form of a human language, and convert the input to one or more logical relationships.

In these aspects, the device can accept an input which specifies the result to be achieved by the instruction sequence, and not the algorithm for achieving the result. This enables the device to produce a sequence of instructions which is optimal without being constrained by the particular order in which the input is presented, as would be the case with a normal compiler. Further, by specifying the results to be achieved in the form of logical relationships, the device is able to create the sequence of instructions by converting the relationships into tests comprised within the set of instructions.

In another aspect, where the device is to produce instructions for a target device (such as a digital signal processor (DSP) chip) which has multiple addressing possibilities, the device is arranged to generate plural instruction sequences making use of the addressing modes, and to select one of the instruction sequences, for example to give the highest execution speed.

In one embodiment, the device according to the invention is operable to generate and store a tree defining plural different possible instruction sequences, and to search the stored tree either to find the shortest instruction sequence or to find the instruction sequence which can be expressed most efficiently in an iterated structure.

In another embodiment, the device operates to generate and store only a portion of the tree, utilising iteration whilst generating and storing the tree.

Other aspects and embodiments of the invention are as described or claimed hereafter. The invention will now be illustrated, by way of example only, with reference to the accompanying drawings, in which:

BRIEF DESCRIPTION OF DRAWINGS

FIG. 2b is a flow diagram showing the operation of a sub routine process called from the process of FIG. 2a to create the contents of the code sequence store;

FIG. 6 is a flow diagram showing the operation of the apparatus of FIG. 1 in a second embodiment of the invention, and corresponds generally to FIG. 2a;

FIGS. 9a and 9b illustrate the correspondence between types of code sequence structure within the code sequence store in the second embodiment and corresponding iterated code in the c programming language.

FIRST EMBODIMENT

Figure 1:
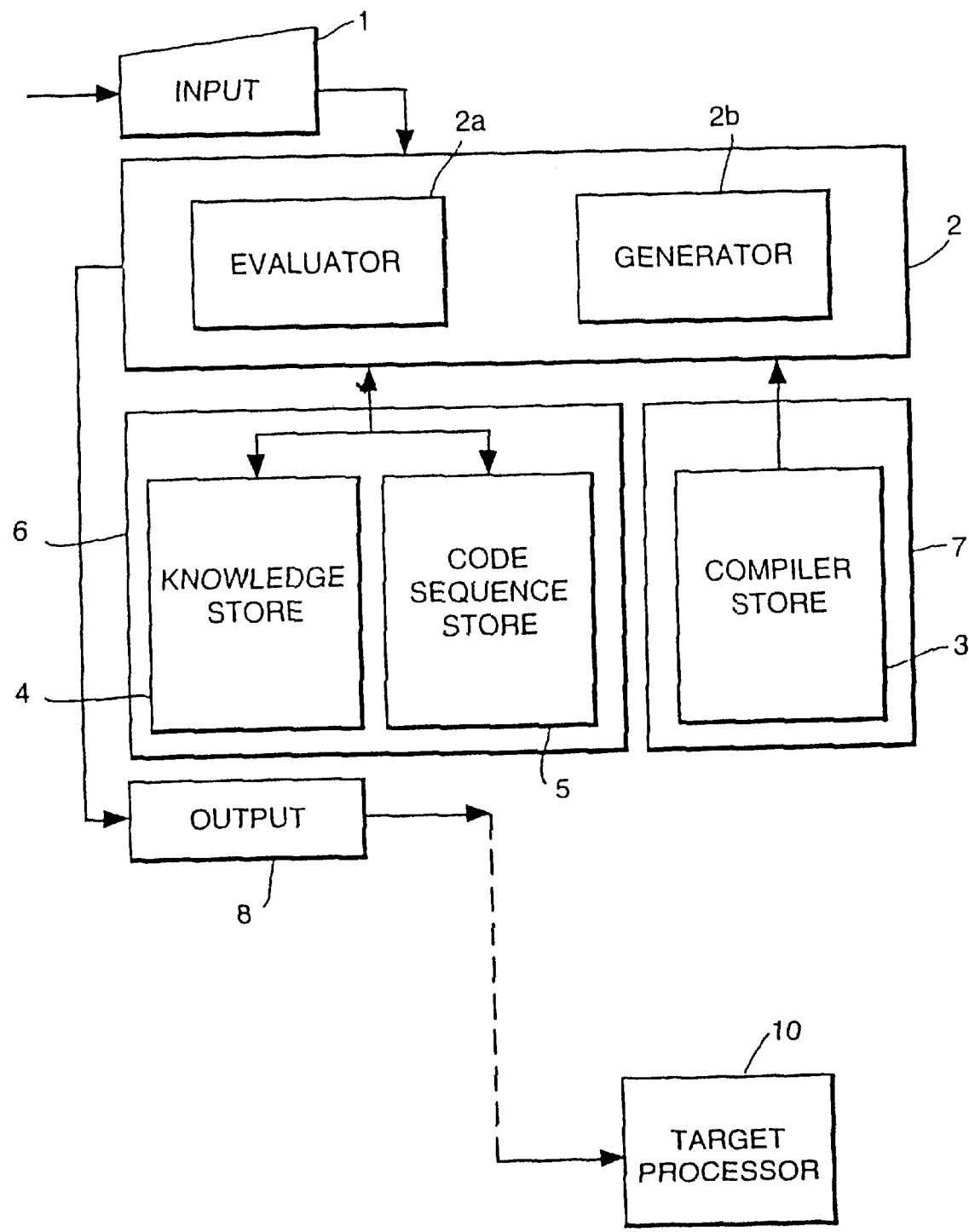
FIG. 1 is a block diagram showing schematically the elements of a device according to a first embodiment the invention for generating code sequences, together with a target device for executing the code sequences.

Referring to FIG. 1, the device of a first embodiment of the present invention comprises input means 1 (for example, a keyboard or terminal); an evaluation device 2a; a number generator 2b; a compiler store 3; a knowledge store 4; and a target core store 5. As shown, the knowledge store 4 and the code store 5 may form areas of read/write memory, such as RAM 6; and the compiler store 3 may form part of a read only memory (ROM) 7. The evaluator 2a and generator 2b may comprise an arithmetic logic unit (ALU) forming part of a general purpose computing device 2 (such as a microprocessor. Also provided is an output device 8 (such as an RS-232 port) through which a set of instructions is transmitted to a target device 10 for executing the instructions at a subsequent point in time.

In this embodiment, the input means 1 is for accepting a specification of a problem for the solution of which a set of instructions is to be executed on the target device 10 is to be produced. The problem is specified in terms of a predicate calculus expression (discussed in greater detail below). the compiler store 3 stores a representation of a sequence of instructions for executing the flow diagram of FIGS. 2a and 2b. Typically, the compiler store 3 is a read only memory (ROM). The instructions stored in the compiler store 3 are performed by the evaluator 2a and generator 2b. The generator 2b generates successive values of input variables, in a predetermined order, for use by the evaluator 2a. The code store 5 stores, during operation of the evaluator 2a. The code defining several alterative sequences of code for executing the function input in the input device 1, one of which is subsequently selected as will be described in greater detail below. The knowledge store 4 stores logical relationships derived, during operation of the evaluator 2a, for subsequent use by the evaluator 2a in deriving the sequences of code to store in the code store 5.

The operation of this embodiment will now be described in greater detail. In this embodiment, a user inputs (by typing) a specification of a problem for the solution of which code is to be generated in the input means 1. The specification is in the form of a predicate calculus expression; that is to say, an expression stating that:

"There exists a value of" (first expression) "such that, for all possible values of" (universal variables), (second expression) "is true".

In such a predicate calculus expression, the first expression is in terms of one or more variables termed "existential variables", and the second expression is a logical expression linking the function with the universal variables.

For example, typically, the existential variables are variables which will be inputs to the target device 10 when it is operating the code to be generated, and the first expression corresponds to the function to be performed by the code on the variables. The universal variables are, on the other hand, utilised by the evaluator 2a in generating code and do not themselves occur in the code generated. Further details of the predicate calculus may be found in "Logic", Wilfred Hodges, published by Pengiun Books, 1977.

To take a concrete example, one commonly occurring problem is to sort an array or vector of data into ascending numerical order. The definition of a sorted array is that, in the sorted sequence, each value is less than or equal to the value which follows it in the sequence. For an input array of n elements, a[n], one way of sorting the array is, rather than physically interchanging the positions of the array members of the array a, to define a pointer array b[n], the first element of which contains a number pointing, within the array a[n], to the lowest occurring element of the array a[n], and so on.

Thus, in use, the generated code being performed by the target device 10 would input the values making up the array a[n] and find, and output, the values making up the array b[n] indicating the order of the values in the array a[n].

Various numerical sorting algorithms are well known; for example, the "bubble" sort, the "ripple" sort or the "shell" sort.

The predicate calculus specification for the sorted array is: sort(a[n])=a[?b[n]|((a[b[i]]<=a[b[i+1]]) and ((b[p]<>b[q]) or (p=q)))].

In other words, the array b[n] is such that, for every value of the universal variables i,p,q, the value of the element of array a indexed by a given element of the pointer array b is less than or equal to the value of the array element of the array a pointed to by the next element of the pointer array b. The two following conditions merely ensure that there is a one to one correspondence between the elements of the array b and the array a.

The "|" character indicates "such that", and the "?" character indicates "there exists" in the foregoing; the variables on the left of the "|" character are the existential variables, and those not declared as existential variables are the universal variables.

At this point, it should be pointed out that this predicate calculus expression is not a unique way of specifying the ort function; for example, simple logical operations of inversion and distribution may be applied to derive exactly equivalent expressions.

The second feature to note is that whilst this expression specifies the result (i.e. the properties of the sorted array) it does not specify any particular algorithm for sorting the array. Several different algorithms, and corresponding code, could be designed which would satisfy the predicate calculus expression. Generally, a sort process operates by inputting the values of the array a[n], assuming initial values of the array b[n], applying the inequality test forming part of the predicate calculus expression, and varying values of the array values of the pointer array are selected and tested which defines the sort algorithm and the efficiency thereof.

Figure 4A:
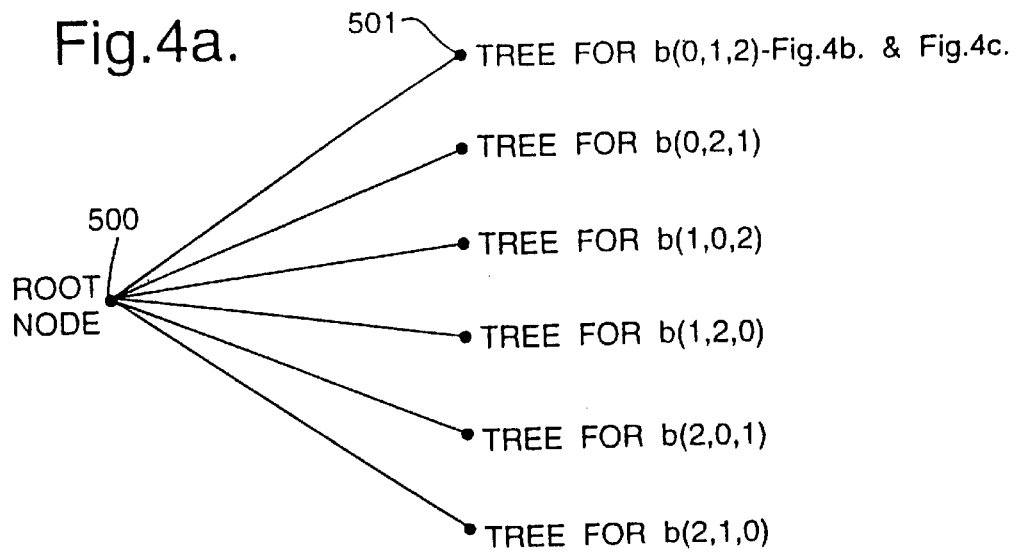
FIGS. 4a and 4b illustrate schematically the contents of the code store forming part of the embodiment of FIGS. 1 and 2.
Figures 1, 4B:
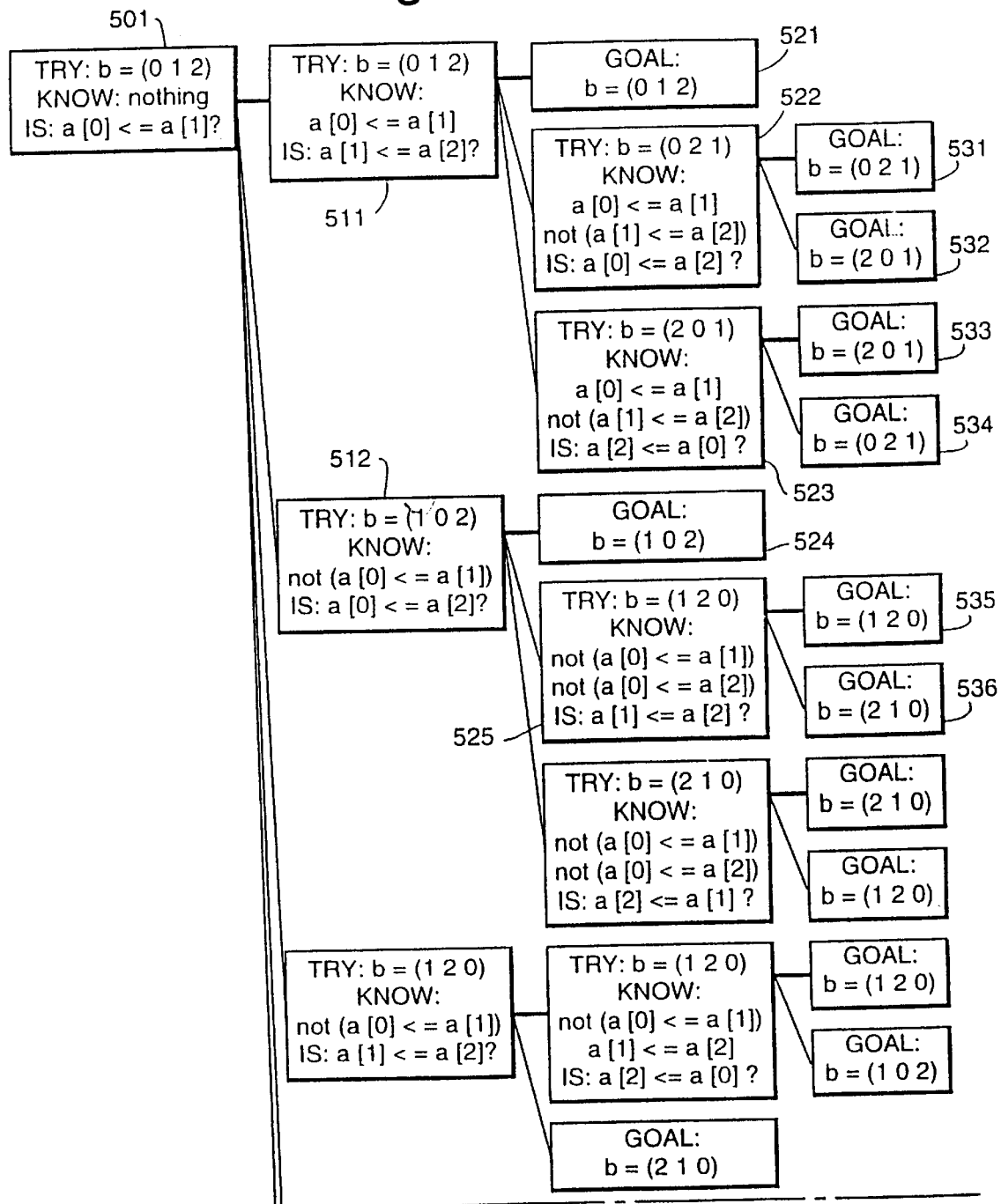
Figures 2, 4B:
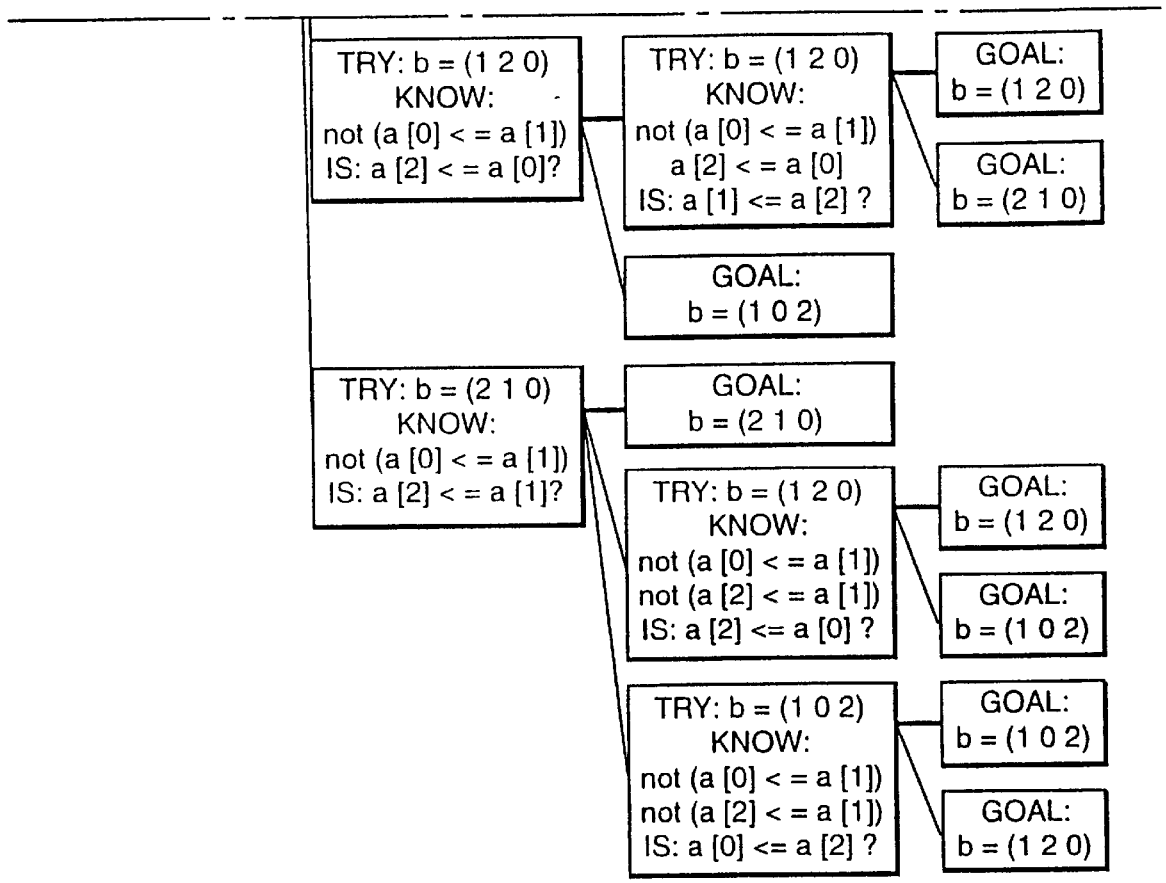

FIG. 2 (formed of FIGS. 2a and 2b) illustrates the method of operation of the device of FIG. 1, in this embodiment.

Figure 2A:
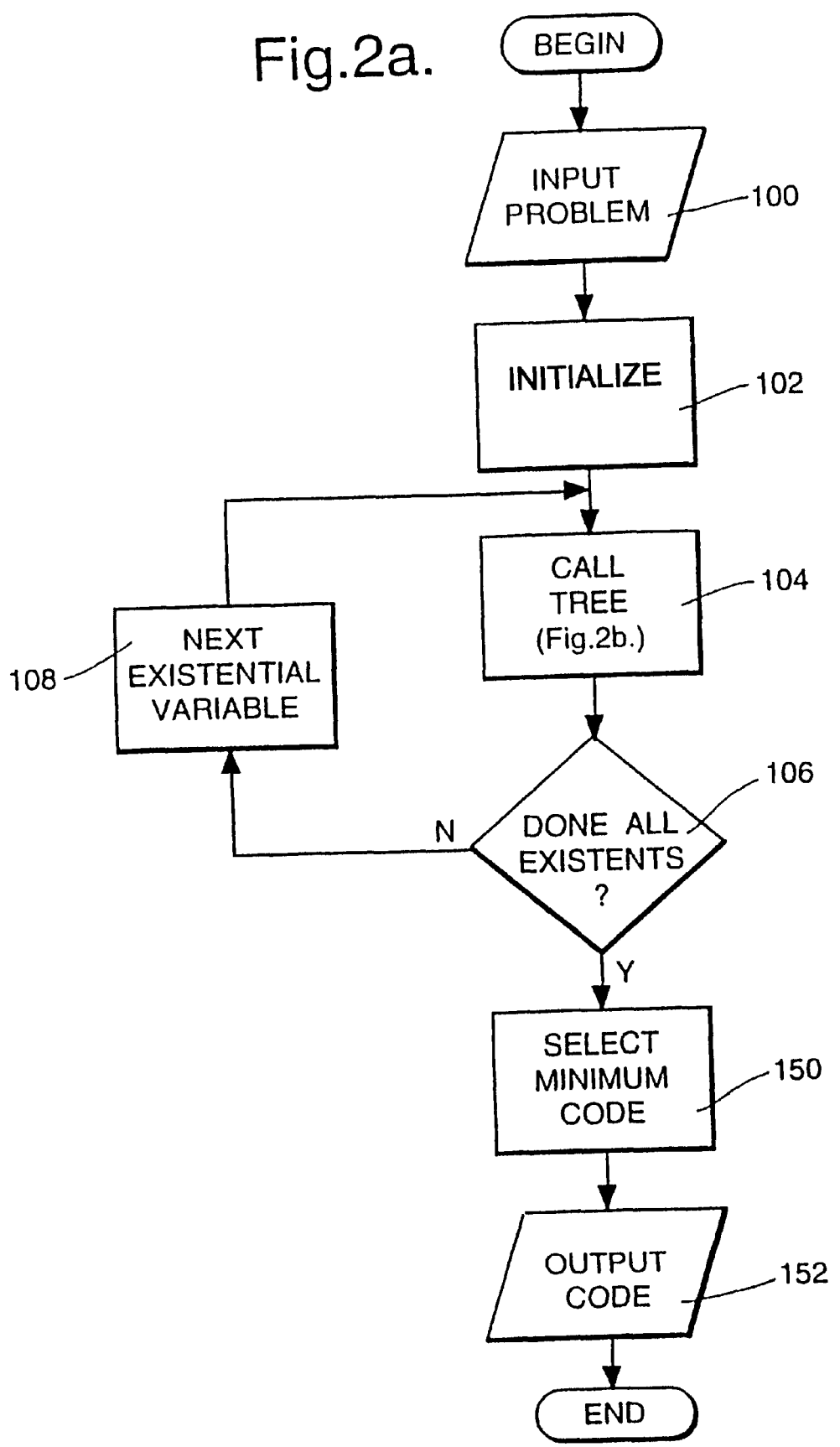
FIG. 2a is a flow diagram showing schematically the process performed by the apparatus of FIG. 1 in a first embodiment of the invention.

Referring now to FIG. 2a, in a first step 100, the predicate calculus expression is input into the input device 1, and the ranges of each of the variables are established and stored. The ranges may be directly input together with the expression, or may be derived from the expression. In this case, the value of each element of the existential vector b ranges between 0 and n−1, as do the values of the universal variables p and q (which are indexing b). The variable i ranges between 0 and n−2 since there is one fewer comparison between the sorted members of the array a than the number of members (n−1) of the array. These ranges are then supplied to the generator 2b.

Initially in step 102 the generator 2b generates a first set of existential variable values (that is, values of the array elements b(0), b(1), . . . b(n−1)). The initial values might typically be 0.

Next, the subroutine of FIG. 2b is called in step 104 to store the tree (if any) for the initial existential variable value. After this, the subroutine of FIG. 2b is called for each successive existential variable value (steps 106 & 108), so that evaluator 2a constructs a tree of possible instruction sequences for each value of the existential variables. Referring to FIG. 2b, in the tree-building subroutine, in step 110, the values of the universal variables are initialised (e.g. to zero) and in step 112 the evaluator 2a evaluates the predicate calculus expression for these variables. Such an evaluation can lead to three possible results. Either the expression evaluates to "false", or to "true", or it is non manifest or indeterminate. In this example, with all variables at 0, the first part of the expression evaluates as true (since b[0]=b[1]=0); the second part of the expression evaluates as false (since b[0]=b[0]) and the third part evaluates as true (as p=q=0). Thus, the expression as a whole evaluates as true.

Referring back to FIG. 2b, where (as here) the result of the evaluation is true, the generator 2b then generates a next value of universal variables (for example, by incrementing q) in step 120.

Now the process returns to step 112 and, once more, the new values of the universal and existential variables are supplied by the generator 2b to the evaluator 2a, which once more evaluates the expression. In this case, as before, the first part of the expression is true, and the second part is false. Now, the third part of the expression is also false (as p is not equal to q) and so the expression as a whole is false.

Wherever the results of the evaluation are false, all ode stored in the code store 5 derived from that set of existential variable values (discussed in greater detail below; none in this case) is erased in step 114, and control returns to FIG. 2a with no tree stored in code store 5. The generator 2b generates a next set of existential variable values in step 108 (for example, by incrementing the value of b[n−1]).

This is because if the expression is evaluated as false for one value of the universal variables, the value of the existential variables concerned clearly cannot be such that the expression evaluates to true for all values of the universal variables, as is required by the predicate calculus form. In the present case, it is in fact clear that the "sort" algorithm can only work when the value of each element of b[n] is different.

If the expression cannot be evaluated (as will be described in greater detail below), the action of the apparatus is (in step 124) to store a decision node in the code store 5, consisting of code defining a logical test, and creating a branch between two possible actions in dependence upon the test result.

Figure 3:
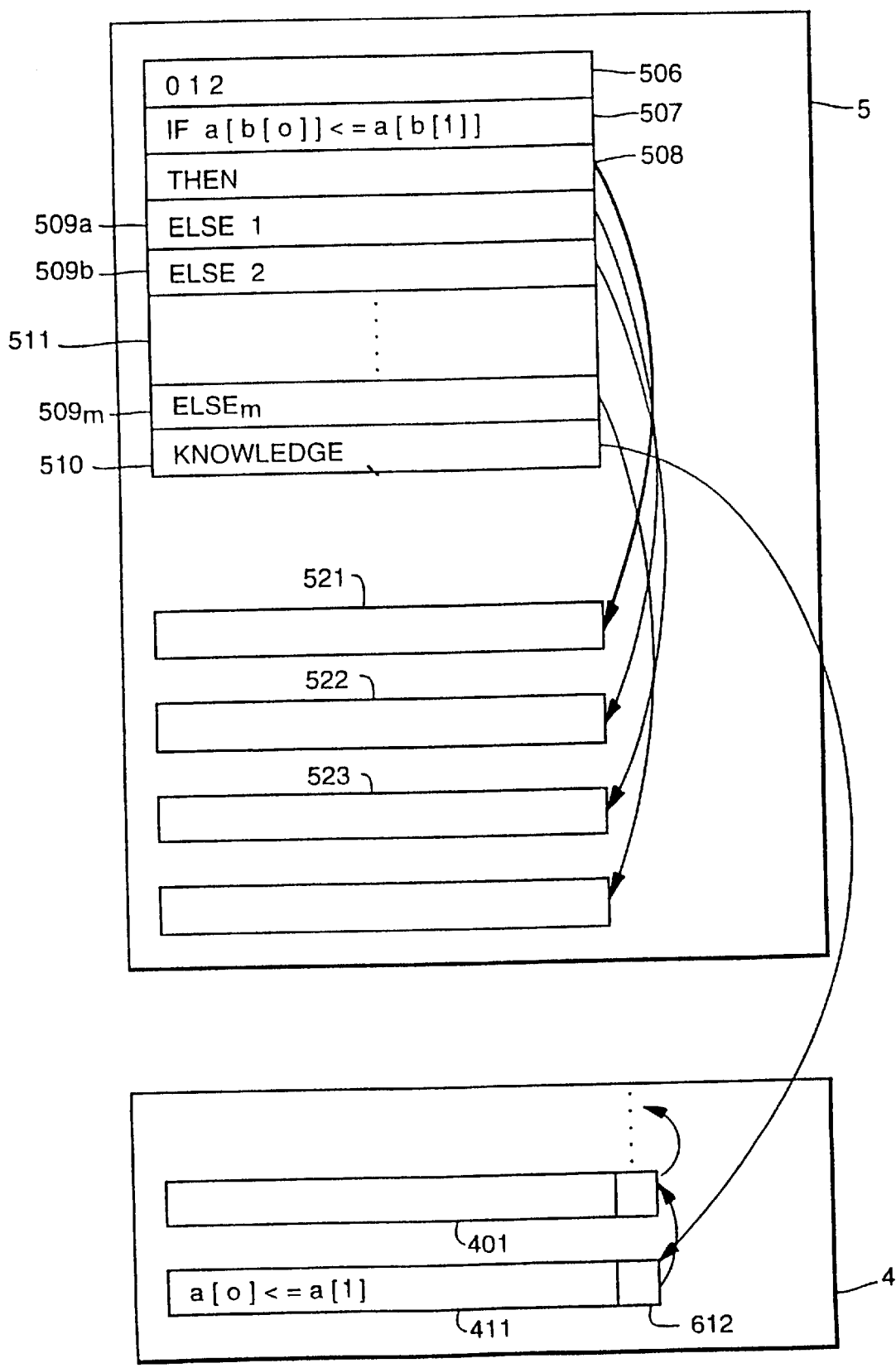
FIG. 3 shows the structure of one node record in the code store of FIG. 1.

Referring to FIG. 3, the structure of a node record 511 in the code store 5 is shown. It comprises a field 506 storing the current values of the existential variables b[n]; a field 507 storing the currently unevaluable test; a field 508 storing a THEN pointer, pointing to the address in the code store 5 of a further node record 521, a plurality of ELSE pointer fields 509a–509m pointing to the addresses in the code store 5 of further node records 521, 522, 523 . . . , and a field 510 storing a pointer to the address in the knowledge store 4 of a record 411 containing the item of knowledge which was most recently stored therein. As shown, the record 411 etc, in the knowledge store 6 also contains a field 412 storing a pointer to an earlier-stored record 401, so that the contents of the knowledge store 6 can be read as a linked list.

The decision nodes within the code memory 5 build into a decision tree, from which each node has at least two branches; a first branch obtained by assuming the results of the logical test to be true, and one or more second branches (in this embodiment one fewer than the total number of possible values of existential variables) each corresponding to a different existential variable value.

Each branch may, of course, contain further decision nodes causing the further branches. Accordingly, the processor 2 executes (in step 128) the process of FIG. 2b recursively, each time such a decision node is reached, so as to create the decision tree originating along each branch of the decision node, before returning to complete the other branches.

Figures 1, 4C:
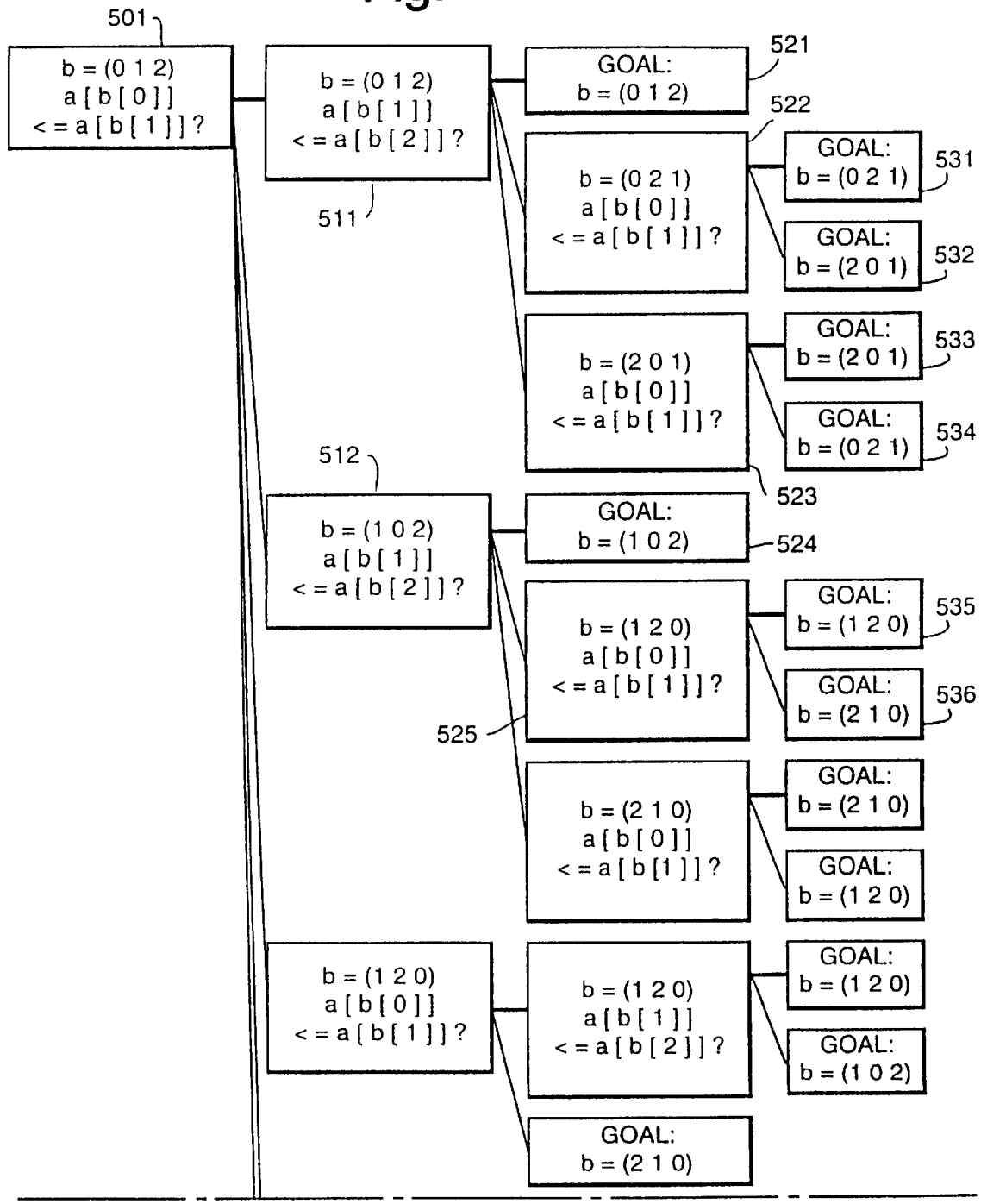
FIG. 4c corresponds to FIG. 4b, and indicates the corresponding tree structure in the form in which it is stored in the code store 5.
Figures 2, 4C:
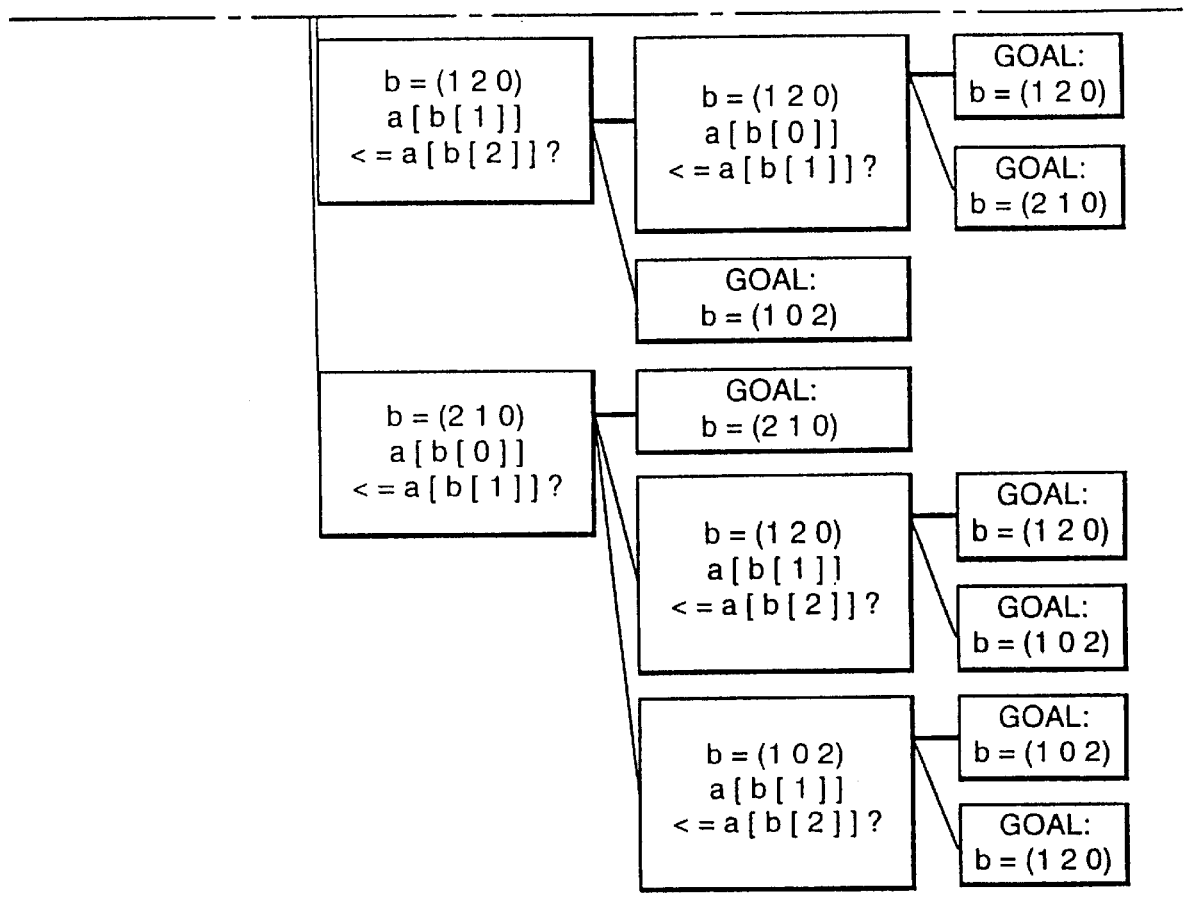

FIGS. 4a and 4b or 4c illustrate the form of the decision tree stored in the code memory 5 in this example with n=3. FIG. 4a illustrates that the tree has six branches, one for each of the six starting values of existential variables generated in the process of FIG. 2a by the generator 2b which do not lead to false evaluations (and hence represent possible starting points for the sort algorithm). One tree branch is shown in greater detail in FIGS. 4b and 4c (for each of understanding, the knowledge from knowledge store 4 associated with each node record is shown with that record in FIG. 4b, and is absent in FIG. 4c).

The tree comprises a plurality of different sequences of code, executing any one of which would solve the sorting problem. Each sequence of code comprises one of the TRUE paths (shown in thick lines) from the route node 500 to a GOAL node, the path comprising a sequence of successive tests, and one of the FALSE paths (shown in thin diagonal lines) from the root node to a GOAL node.

The operation of the evaluator 2a will now be disclosed in greater detail. As a first step, the evaluator operates, as discussed above, to evaluate the expression which was input via the input device 1. If this does not result in a true or false value, in this embodiment the evaluator 2a proceeds to apply some additional trivial rules such as:

x=x=true
x<x=false
x>x=false
x<>x=false
x>=x=true
x<=x=true and the following implications:

| | | | | |
|---|---|---|---|---|
| a=b | -> | b=a, | ¬(a<>b), | ¬(b<>a) |
| a>b | -> | b<a, | ¬(a<=b), | ¬(b>=a) |
| a<b | -> | b>a, | ¬(a>=b), | ¬(b<=a) |
| a<=b | -> | b>=a, | ¬(a>b), | ¬(b<a) |
| a>=b | -> | b<=a, | ¬(a<b), | ¬(b>a) |
| a<>b | -> | b<>a, | ¬(a=b), | ¬(b=a) |
| (a=b) and (b=c) | | | -> | a=c |
| (a<b) and (b<c) | | | -> | a<c |
| (a>b) and (b>c) | | | -> | a>c |
| (a<=b) and (b<=c) | | | -> | a<=c |
| (a>=b) and (b>=c) | | | -> | a>=c |
| a=b | | -> | ¬(a<b), | ¬(a>b) |
| a<b | | -> | ¬(a>b), | ¬(a=b) |
| a>b | | -> | ¬(a<b), | ¬(a=b) |
| ¬(a<=b) | | -> | b<=a, | ¬(a=b) |
| ¬(a>=b) | | -> | b>=a, | ¬(a=b) |

To apply each of these rules, the portion of the expression which has been found not to be evaluable is examined to test whether it has the form of any of the above relations, and if so, the corresponding relations are substituted in turn and an attempt is made to evaluate them. The evaluator 2a may operate in the same manner as a conventional artificial intelligence program or inference engine.

If this too is unsuccessful, the evaluation device 2a accesses the knowledge store 4, to see whether there is a match for the unevaluable part of the expression together with the corresponding answer stored therein, or whether the answer can be implied from the relationships stored therein.

The contents of the knowledge store, and the operation of the evaluator 2a in writing thereto, will now be discussed in greater detail.

The contents of the knowledge store 4 comprise logical relationships which were unevaluable and hence gave rise to a decision node in the code store 5, and to which values have subsequently been assigned for the purpose of constructing each tree branching from the decision node. To construct the tree shown in FIG. 4b, referring once more to FIG. 2bon reaching an unevaluable expression, the processor 2 creates a decision node record 501 in the code table 5 and stores the current value of the existential variables b[n] in step 124. Also stored is the test which proved not to be evaluable (in this case "is a [b[0]]<=a[b[1]]), together with a "TRUE" or "THEN" pointer (shown as a thick line) to the tree to be constructed on the assumption that the result of the test is true, and a plurality of "FALSE" or "ELSE" pointers (shown as thin lines) to a plurality of trees to be constructed on the assumption that the outcome of the test is false and corresponding to changed existential variables.

Next, in step 126 the processor 2 stores, in the knowledge store 4, a record 411 comprising data indicating that the relationship a[0]<=a[1] is true, together with a pointer field in the record 511 pointed to by the "THEN" pointer stored in the code store 5 so that this information will be available in evaluating relationships in the decision tree pointed to by the "THEN" pointer.

The processor 2 is then operable to store the current state of its internal registers and variables (e.g. in a stack, now shown) and to execute a recursive call to the routine of FIG. 2b. The process formed by the routine of FIG. 2b would be a repetition of what has just gone before, except that now on reaching the point of evaluating the relationship, the evaluator 2a accesses the knowledge store 4 and finds that, using the data stored therein, it is now possible to evaluate whether a[0] is <=a[1], and accordingly, at this point the result of the evaluation is true, rather than unevaluable.

Since the initial operations prior to this point are repeated, it would be possible to re-design the process shown in FIG. 2b to omit such repetition; this modification has been omitted for clarity.

The processor 2, under the operation of FIG. 2b then proceeds to evaluate the "true" or "THEN" decision tree, possibly in the process encountering further unevaluable expressions and consequentially storing further decision nodes in the code table 5 and executing further recursive calls to the process of FIG. 2b. At some point, unless a false evaluation is reached, the process of FIG. 2b will return from each recursive call, to reach step 130 of FIG. 2b. Thereafter, for each of the other values of existential variables, the processor 2 creates an "ELSE" path in a step 134 by selecting a corresponding changed value of the existential variables; stores, for that path, a record comprising data defining a relationship consisting of the test which was found to be unevaluable with the results set to false (i.e., in this case, a [0]<=a[1]=false) with a pointer to that record from the nodes in the code store 5 pointed to by each ELSE pointer, so as to be available for all subsequent evaluations in the decision tree based on that path (in step 132).

Next, as in step 128, in step 136 the current contents of registers and variables are stored and a recursive call to the process of FIG. 2b is performed, so as to construct the decision tree corresponding to the changed values of the existential variables set in step 134. When this process is complete, it is terminated by the return step 116 on which the stored contents of registers and variables are restored by the processor 2, so as to continue execution at step 130 to construct the decision trees for each other possible value of existential variables.

Unless terminated by a step 114, the subroutine of FIG. 2b will ultimately reach a point where the input relationship becomes evaluable (and TRUE). At this point (labelled GOAL in FIG. 4b), the values of the existential variables constituted the solution to the input problem. Thus, such a node defines the end of the code sequence to be generated for the target processor 10, and will be interpreted thereby as code instructions to output the existential variable values and stop execution. A GOAL node is therefore stored in the code store 5 in step 119, comprising the current existential variable values and a STOP or OUTPUT code indicator.

If, in step 114, the evaluator 2a reaches a false result, then all decision nodes stored in the code store 5 are erased back to the nearest change of existential variable, since (as discussed above) only values of the existential variables for which the expression is always true lead to correct code to execute the function. As a result, once the process of FIG. 2b has ceased and passed control back to the processor FIG. 2a, the code store 5 may have only a relatively sparse number of decision nodes, compared to the total number which in this embodiment have been created in the code table 5 and subsequently erased in the step 114.

Once a decision tree has been created, by the process of FIG. 2b, for each possible value of the existential variables created by the generator 2b, the processor 2 proceeds to step 150. At this stage, the content of the code store 5 corresponds to FIGS. 4a to 4c. At this point, the contents of the knowledge store 4 are redundant and may be erased. From the contents of the code store 5, it is possible in general to construct a plurality of different algorithms for solving the problem corresponding to the predicate calculus statement input at the input device 1, since it is possible to start with any of the six trees, and then at each decision node to use only one of the THEN paths.

The code sequence for the target processor thus merely consists of:

an input code for inputting a[n]

a first test (corresponding to that stored in record 501], and two branch instructions to be performed if the results of the test are, respectively, true or false;

possible one or more further nodes each consisting of a test and a pair of branch instructions; and at the end of each branch, an output statement outputting the values of the existential variables b[n] at a GOAL node.

Naturally, one of the branches may simply be to the next instruction, avoiding the need for a separate second branch instruction.

Thus, within the target device 10, the first step of the generated code consists of an input of the array a[n] to be sorted, and then the code detailed above. On reaching a GOAL point, the current values of the pointer array b[n] are output, defining the correct sorted order of the input array a[n].

In this embodiment, the next step is to select the code which will execute in the shortest time (i.e. would involve the least number of in-line steps).

Figure 5:
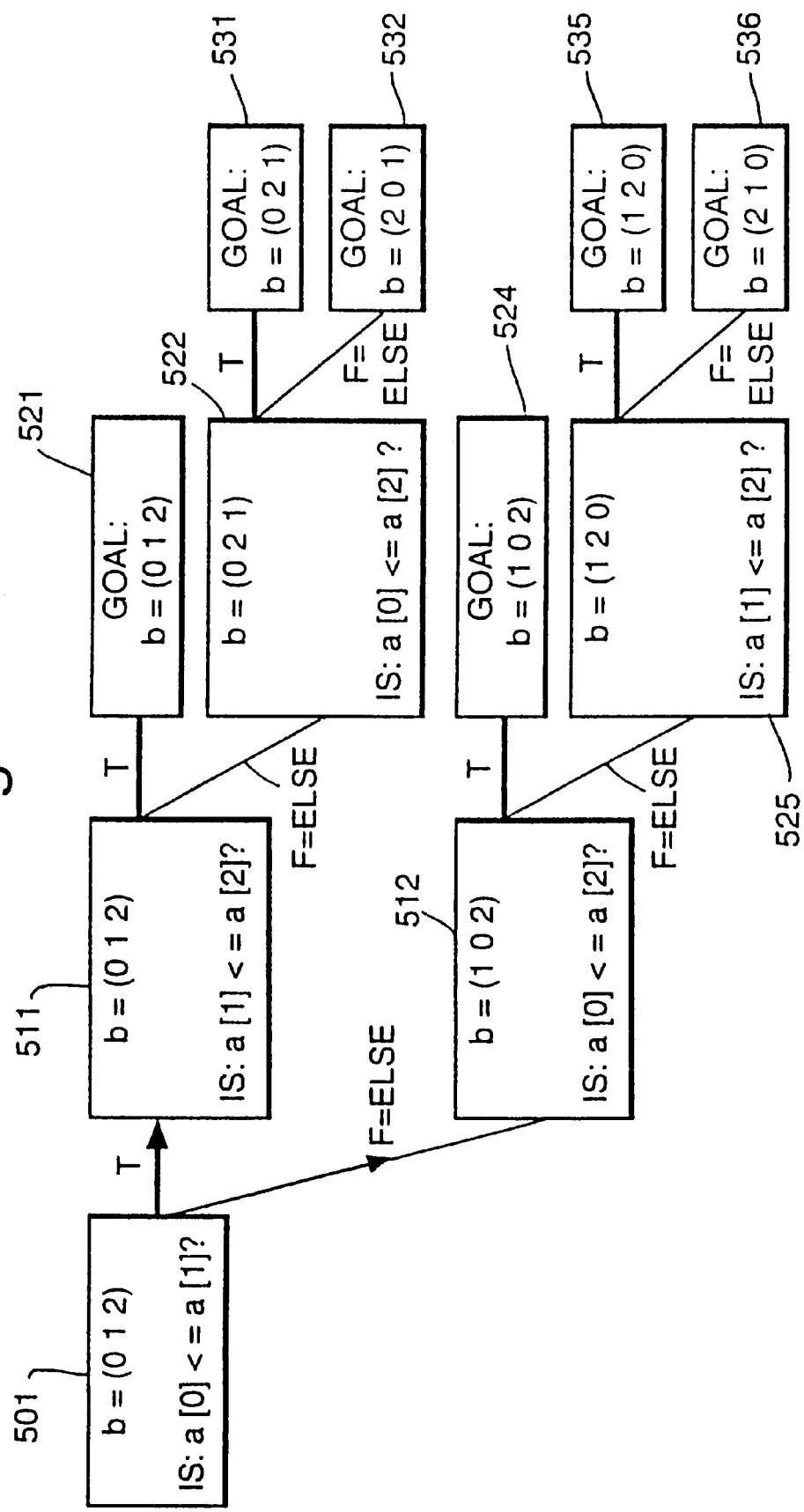
FIG. 5 corresponds to FIG. 4b and shows schematically the structure of one sequence of instructions derivable from the code store.

Referring to FIG. 5, one portion of the tree of FIGS. 4b or 4c is shown, which corresponds to code defining the bubble sort algorithm starting on the assumption that the vector array a[n] is correctly ordered (b=(012)). It can be seen that this algorithm will sort a three member array a[n] in a minimum of two tests or a maximum of three.

A high level representation of the code stored in code table 5 in relation to a four element sort corresponding to FIG. 4 is as follows:

alldiff vec[4] = exist|((vec[p]<>vec[q]or(p=q)).
sort a[4]=?b[4]|((a[b[i]]<=a[b[i=1]]) and alldiff(b)).
sort a[4]=
    b:=(3 2 1 0)
    if a[b[0]]<=a[b[1]]
    then
        if a[b[1]]<=a[b[2]]
        then
            if a[b[2]]<=a[b[3]]
            then GOAL
                else
                    b[3]:=1 b[2]:=0
                    if a[b[1]]<=a[b[2]]
                    then GOAL -continued

```
                      else
                          b[2]:=2 b[1]:=0
                          if a[b[0]]<=a[b[1]]
                          then GOAL
                                     else b[1]:=3 b[0]:=0 GOAL fififi
    else
        b[2]:=2 b[1]:=1
        if a[b[0]]<=a[b[1]]
        then
              if a[b[2]]<=a[b[3]]
              then GOAL
                  else
                      b[3]:=2 b[2]:=0
                      if a[b[1]]<=a[b[2]]
                      then GOAL
                          else
                              b[2]:=1 b[1]:=0
                              if a[b[0]]<=a[b[1]]
                              then GOAL
                                     else b[1]:=3 b[0]:=0 GOALfififi
    else
        b[1]:=3 b[0]:=1
        if a[b[2]]<=a[b[3]]
        then GOAL
             else
                 b[3]:=2 b[2]:=0
                 if a[b[1]]<=a[b[2]]
                 then GOAL
                     else
                         b[2]:=3 b[1]:=0
                         if a[b[[0]]<=a[b[1]]
                         then GOAL
                                 else b[1]:=1 b[0]:=0 GOALfifififi
    else
        b[1]:=3 b[0]:=2
        if a[b[1]]<=a[b[2]]
        then
             if a[b[2]]<=a[b[3]]
             then GOAL
                  else
                      b[3]:=1 b[2]:=0
                      if a[b[1]]<=a[b[2]]
                      then GOAL
                          else
                              b[2]:=3 b[1]:=0
                              if a[b[0]]<=a[b[1]]
                              then GOAL
                                     else b[1]:=2 b[0]:=0 GOALfififi
    else
        b[2]:=3 b[1]:=1
        if a[b[0]]<=a[b[1]]
        then
            if a[b[2]]<=a[b[3]]
            then GOAL
                else
                    b[3]:=3 b[2]:=0
                    if a[b[1]]<=a[b[2]]
                    then GOAL
                        else
                            b[2]:=1 b[1]:=0
                            if a[b[0]]<=a[b[1]]
                            then GOAL
                                   else b[1]:=2 b[0]:=0 GOAL fififi
    else
        b[1]:=2 b[0]:=1
        if a[b[2]]<=a[b[3]]
        then GOAL
            else
                b[3]:=3 b[2]:=0
                if a[b[1]]<=a[b[2]]
                then GOAL
                    else
                        b[2]:=2 b[1]:=0
                        if a[b[0]]<=a[b[1]]
                        then GOAL
                                else b[1]:=1 b[0]:=0 GOALfifififi
```

In this example, all the possible algorithms in the code store 5 would execute in the same number of steps as that shown in FIG. 4. However, this is not the case in many other situations. Accordingly, in this embodiment, in step 150, the processor 2 evaluates the number of instructions required to produce an in-line programme or sequence of instructions for each possible algorithm represented within the code store 5, each algorithm consisting one of the THEN paths (shown in thick lines in FIG. 3b) for one of the trees of FIG. 3a, and, at each of the decision nodes thereon, one of the ELSE paths. The algorithm having the lowest number of steps is then output to the output device 8, comprising either a write head to write the code to a record carrier (e.g. magnetic disk), or an RS232 port, or other device for supplying the code direct to the target processor device 10.

SECOND EMBODIMENT

In the above embodiment, the processor 2 is arranged to generate in-line code having the shortest length from amongst the possible code sequences contained in the code store 5.

Figure 6:
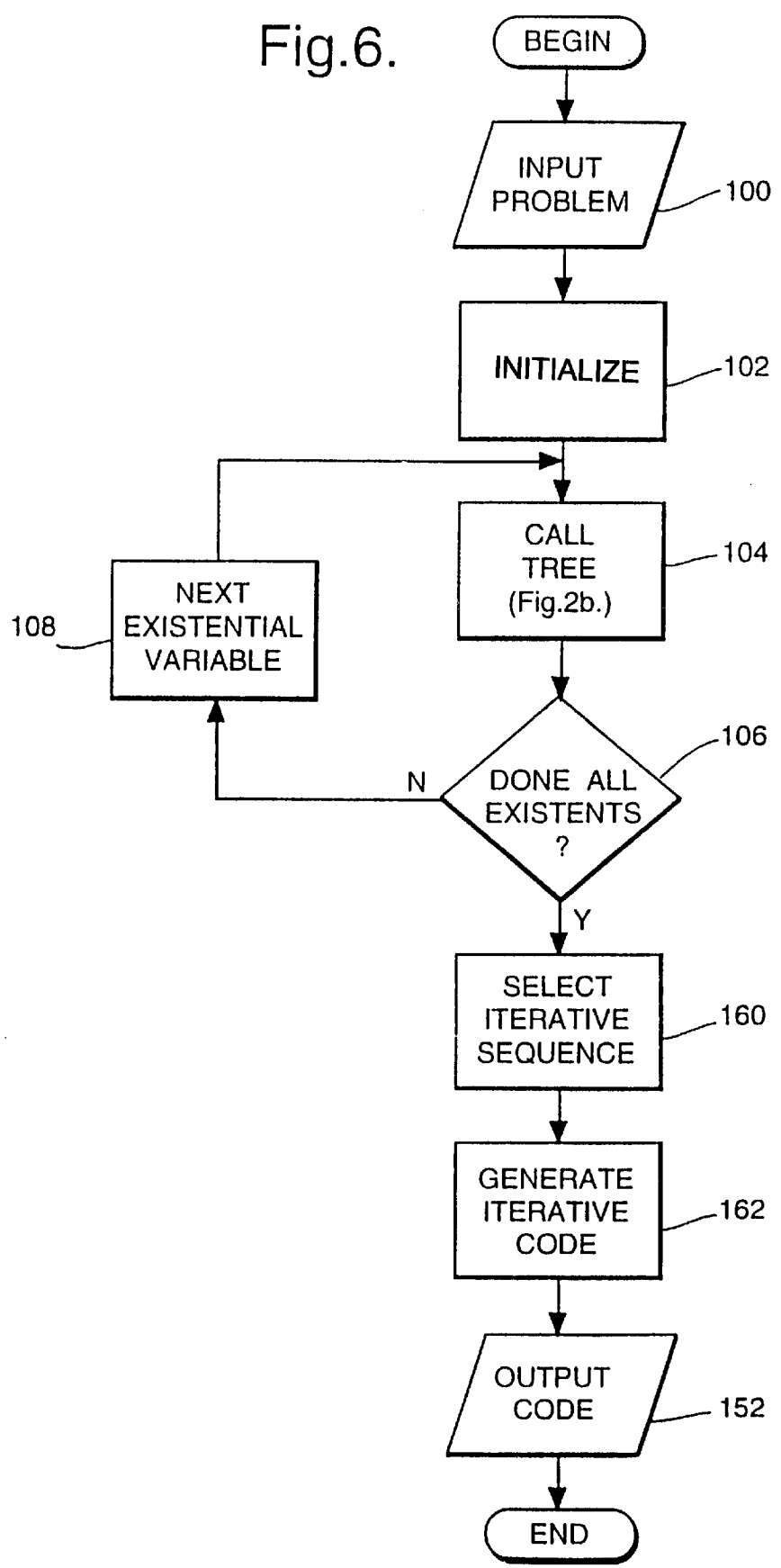

In this embodiment, referring to FIG. 6, exactly the same process is followed to generate the contents of the code store 5. However, having done so, use is made of the capabilities of iteration and indexing offered by a target processor 10 to select, in a step 160, the code sequence in the code store 5 which is most readily converted to iterative form and to generate therefrom a sequence of instructions which include iteration. This therefore makes effective use of the available programme memory of the target processor 10, typically without substantial reduction in execution speed.

This is achieved by searching the decision tree stored in the code store 5 to locate those sequences in which changes in the value of the existential variables follow a regular progression (e.g. a simple, incremental arithmetic progression), and then creating code to cause an iteration to provide the progression.

It will be observed from FIGS. 4b and 4c that in the above example, a first record 511 and the second record 512 store the same test step, and moreover that the structure of the tree portions following the two records 511, 512 are the same and the tests stored in the corresponding decision nodes of the two tree portions are the same. What differs between the two are the associated values of the existential variables b[n].

It would therefore be possible, instead of branching to the node 512, and performing the test at that node and those of the subsequent portions of the tree, to substitute an instruction changing the values of the existential variables b[n] and then return to continue executing the instructions at decision node 511 and the subsequent nodes in the tree thereafter. Accordingly, a first step in reducing the amount of code required to execute the desired process is to search the contents of the code store 5, and on locating such examples of duplicated tree portions, to flag them to indicate that they may be replaceable with instructions to change the existential variables and return.

In the example shown in FIGS. 4b and 4c, it will be apparent from inspection that the required instructions are simply of the form that if the two elements tested do not meet the test, then their positions are interchanged; this is, in essence, the bubble sort process.

Figure 7:
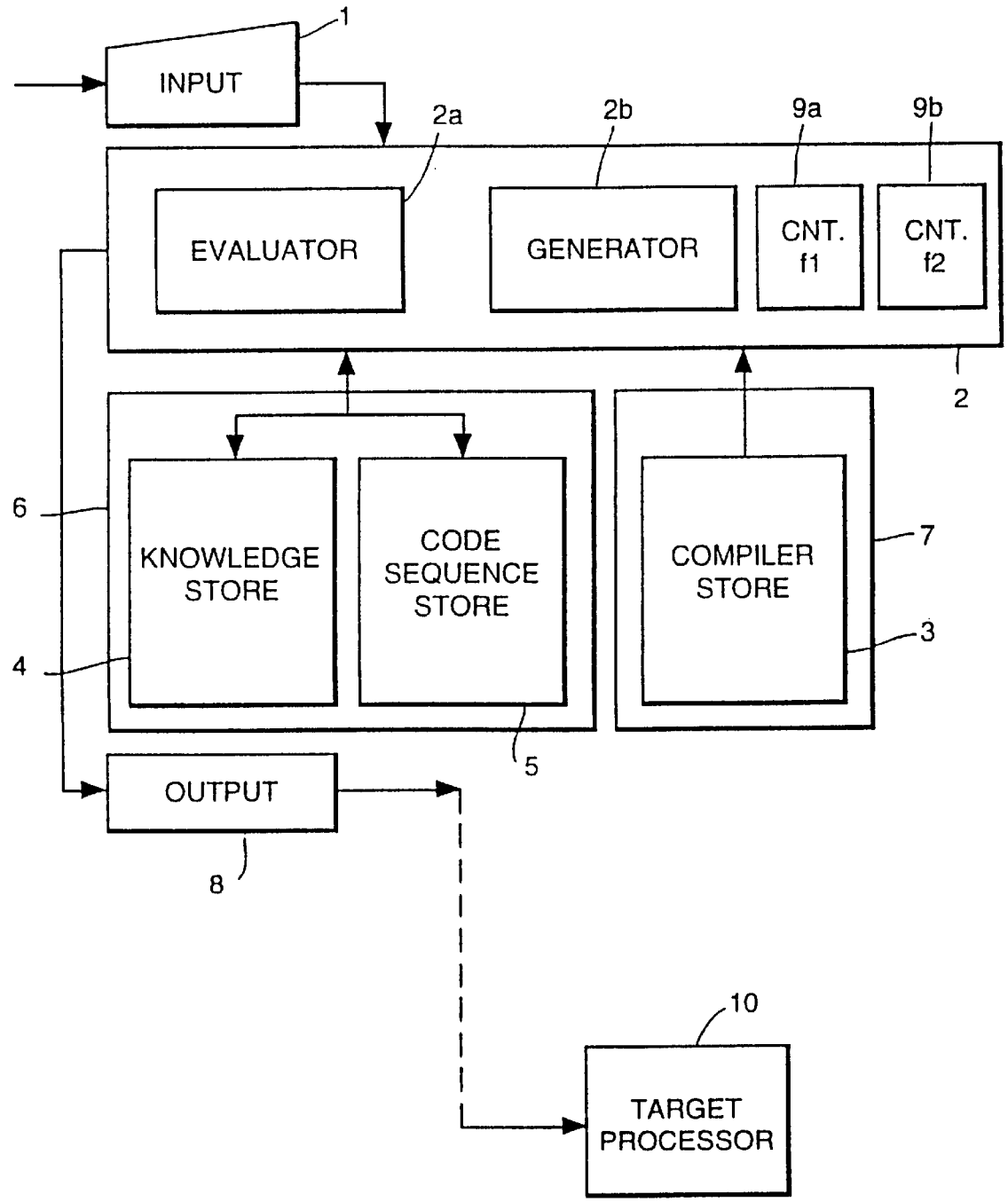
FIG. 7 is a block diagram showing schematically the elements of a device according to the second embodiment, and corresponding generally to FIG. 1.

The apparatus of this embodiment (shown in FIG. 7) corresponds to that of the first embodiment with the addition of iteration function counters 9a, 9b (forming part of processor 2).

In general in this embodiment, the processor 2 searches the code table 5 to locate similar tree portions having tests in which the existential variable values are in some simple progression which can be iterated by an iteration function f(i). For example, the simplest (and probably the most usual) case is where the existential variable values form an arithmetic progression of the form f(i)=(m*i+c). However, other simple progressions such as f(i)=(m*i+c)mod(a) may equally be used. Complex functions which consist of a piecewise sequence of simple functions over different ranges may also be employed.

Figure 8:
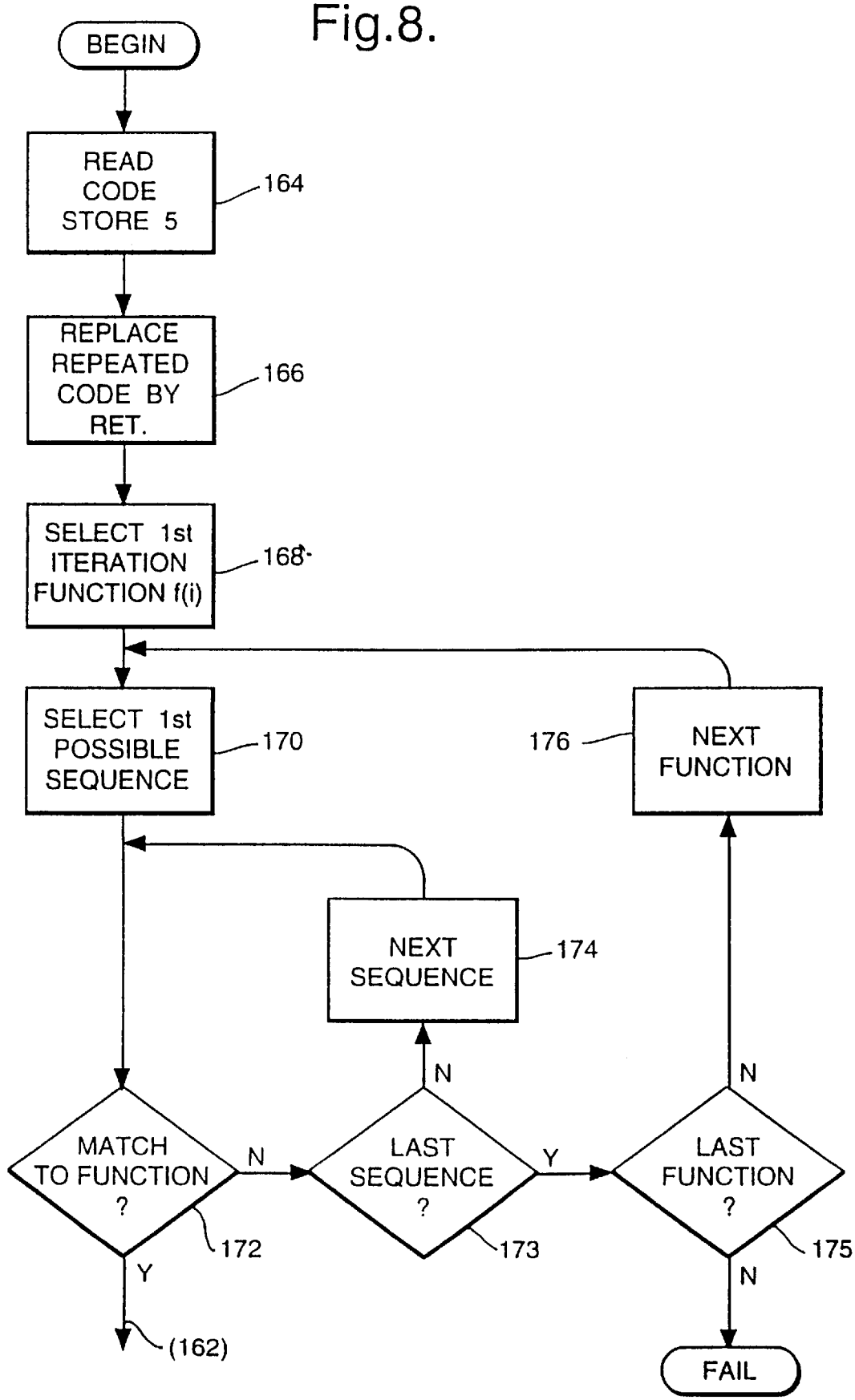
FIG. 8 is a flow diagram showing in greater detail a part of the flow diagram of FIG. 6 in the second embodiment.

Referring to FIG. 8, in this embodiment the step 160 of selecting an iterative portion of the tree consists of the steps 164 to 176 shown in FIG. 8. First, the processor 2 reads the code store 5 in a step 164. In a step 166, repeated code portions (such as the portions 512 and 511 in FIG. 4c are located and replaced with statements indicating a change in the existential variables followed by a return (as discussed above). In step 168, a first iteration function f(i) is selected. This is typically an arithmetic progression f(i)=m*i+c, where m and c are constant.

Next, a first possible sequence within the code store is selected; starting at the first or root node 500 of the code sequence data in the code store 5 (shown in FIG. 4a). The initial value of the existential variables b are taken as the constant c in the function, and the change in existential variable value from the first node to the second is used as the scaling factor m. The value of this first function $f_1$, indexing the existential variables, is maintained by the first counter 9a. A second function $f_2$ is likewise maintained by the second counter 9b to index the universal variables, which appear as the indices within the tested expression (i.e. a[b[i]]). Subsequent steps in the sequence are then tested to see whether the changes in the existential variables along the "ELSE" paths, and the changes in universal variables at each decision node, correspond to successive values of the functions $f_1$ and $f_2$ respectively. If they do so, the code sequence concerned can be iteratively generated by the functions $f_1, f_2$ concerned.

The processor 2 passes through the sequences in the code store 5 in steps 173 and 174 until all sequences have been tested using the first type of iteration function (e.g. linear extrapolation). At this point, if no code sequence has been found which can be iteratively constructed, the processor 2 selects a second type of iteration function (for example, f(i)=(m*i+c) mod(a)) to be generated by the counters 9a, 9b. Each possible sequence in the code store 5 is tested against the second (or, in general, a further) predetermined iteration function by the processor 2 until a match is found, indicating that the sequence can be iterated.

On finding a sequence which can be iterated, control returns to step 162 of FIG. 6, and the processor 6 utilises the sequence from the code store 5 and the iteration function found to correspond to the sequence to construct iterative code in the code store 5, by constructing an iterative loop for each of the universal and existential variables, the loops being the same length as the length of the sequence in the code store 5, and embedding within the loop a generic "IF" statement corresponding to the test in each decision node in the sequence (indexed by the function $f_2$ of the loop counting variable i) and generic THEN and ELSE statements (the latter including a change of the existential variables indexed by the function $f_1$ by the loop counting variable i). This iterative code is then output in step 152 as before to the target processor 10.

Figure 9A:
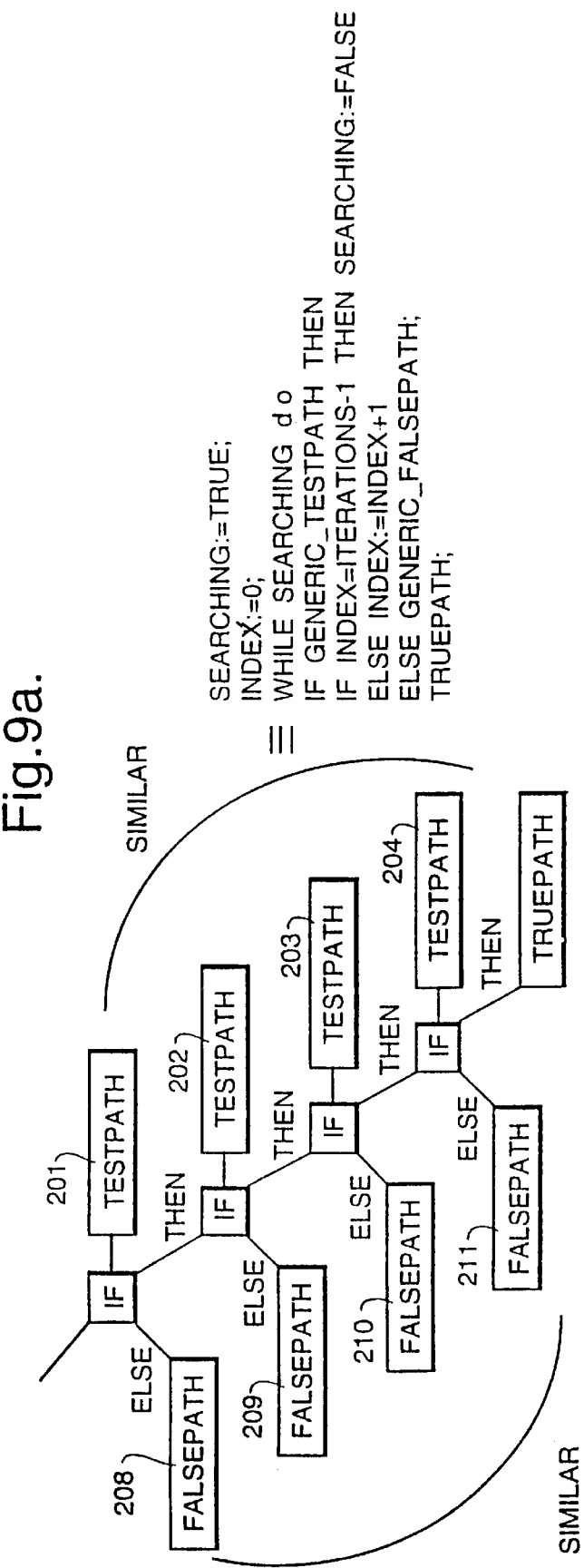

FIGS. 9a and 9b illustrate examples of tree structures within the code store 5 which lend themselves to iteration according to this embodiment, together with the corresponding equivalent code generated by this embodiment in the "C" programming language. In this diagrams the "testpaths" 201–207 indicate the test decision stored at each node within the code store 5, whereas the "falsepaths", "actionpaths" and "elsepaths" 208–216 indicate the actions taken following the THEN pointers after each such decision stage. "RET" in FIG. 9b indicates a "return" instruction substituted into the code store 5 in the step 166 of FIG. 8 (which may either be a return from a call, or some other instructions such as "goto" instruction).

In this embodiment, it is therefore possible to produce more compact, iterated code having the same effect as the "in line" code of the first embodiment, typically at a small penalty in execution speed required to calculate the iteration indexing variables during execution by the target processor 10.

As described above, the processor 2 halts and outputs the first iterated code found in the code table 5. It would, however, be possible in further variations of this embodiment for the processor 2 to generate iterated code in the manner described above and store the iterated code in the code store 5, and then to continue searching for further possible iterated code sequences. After the searching the code store 5 completely for one or more possible iteration functions $f_i$, if multiple different iterated code sequences are found and stored in the code store 5, the processor 2 then would perform a step of selecting a preferred sequence, as in the first embodiment, based (in one example) on the amount of memory occupied by each iterated sequence to select the shortest, or (in another example) on the execution time which will be used by each iterated sequence. The preferred sequence thus selected is then output in step 152 as before.

Although, in the above described embodiments, one counter 9a has been used for the existential variables considered as a single vector and likewise one counter 9b has been used for the universal variables, it is possible instead to provide a separate counter for each existential and/or universal variable.

In the above embodiment, in the event that the process of FIG. 8 does not lead to the generation of any iterative code, the processor may be arranged to perform step 150 of FIG. 2a of the first embodiment, to select the shortest in-line code from the code store 5.

THIRD EMBODIMENT

In each of the above two embodiments, the entire code possibility tree is generated in the code store 5 and a code sequence is selected therefrom. In fact, it is not necessary to generate the entire tree, although generating a subset of the tree will reduce the choice of code sequences or algorithms available for selection. One possibility would be to simply terminate the operation of FIG. 2a or FIG. 5 after a certain number of existential variable values have successfully led to the construction of a code tree portion. However, there is no guarantee that the portion of the tree thus generated will include preferred code sequences.

In this embodiment, the operation of the generator 2b is modified so that, in generating changes to the existential variables, it acts somewhat in the manner of the iteration function counters 9a, 9b of the second embodiment. Thus, the changes in existential variable value from decision node to decision node forwards in the tree stored in code store 5 are forced to follow a regular progression which can be converted to an iterative code sequence. As in the preceding embodiments, more than one possible sequence is generated in the code store 5 to enable a selection step between sequences. It would be possible, in this embodiment, to generate only a single sequence (but this is not preferred, since although it would generate an executable sequence it would not necessarily generate a sequence of short length or high execution speed relative to other possible sequences).

Figure 10:
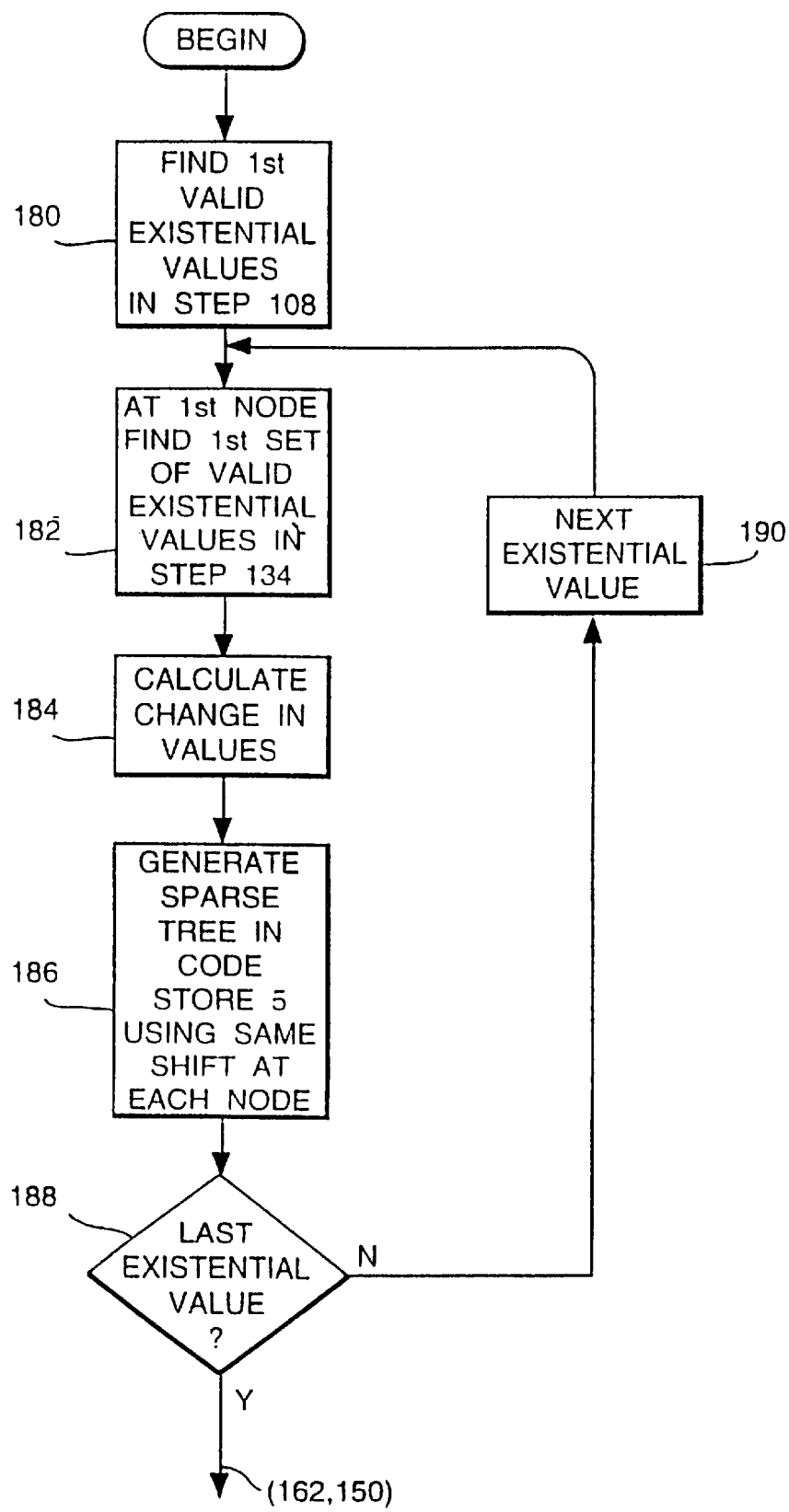
FIG. 10 is a flow diagram illustrating the modification of the operation of the first embodiment in a third embodiment of the invention.

Referring now to FIG. 10, in this embodiment, the device of FIG. 1 follows essentially the process of FIGS. 2a and 2b, but the step of selecting the next existential variable in step 108 and step 134 is modified so that the next value selected follows a sequence which can be used to generate an iteration loop.

In greater detail, in this embodiment the sequence generator 2b initially generates a succession of existential variable values, until such time as a first existential variable value is generated which leads to the creation of a tree in the code table 5 (i.e. the first existential variable value is reached which represents a valid starting point of the solution of the problem input at the input means 1). At the first decision node in the tree generated in the code store 5, at the step 134, the processor 2 stores a second existential variable value, comprising the next-occurring existential variable value for which a valid subsequent tree portion is generated. Then, rather than continuing to generate, in turn, each existential variable value in the step 134 in an incremental sequence, the processor 2 forms a linear extrapolation $f(i)=m*i+c$ between the first and second existential variable values (to derive the scaling factor m) and applies the same change to the existential variable values in the derivation of the FALSE or ELSE paths in the successor tree generated in the code table 5. Thus, for each FALSE or ELSE path from the first decision node 500, an attempt is made to generate a tree which is susceptible of iteration according to a linear iteration function $f(i)=m*i+c$, as in the second embodiment.

Having completed the above described process, the processor is then arranged, as in the second embodiment, to perform the step 162 of converting the in line code sequences in the code store 5 into iterated code. In this case, each sequence stored in the code store 5 (if any) will be susceptible of such conversion. Subsequently, the step 150 of the first embodiment of selecting a preferred code sequence based on either on the length of the iterated code or the execution speed thereof is performed by the processor 2.

Thus, in this embodiment, only a portion of the tree generated in the first or second embodiments is created in the code store 5. This renders the execution of this embodiment significantly faster, and requires less capacity in the code store 5.

For some types of problem input in the input means 1, this process will lead to only a small number of possible code sequences in the code store 5 (i.e. a very sparse tree), or possibly only a single solution. It may also lead to no solution, if the problem is not susceptible of linear iteration.

In such cases, the processor 2 is arranged to repeat the above described process by using a different iteration function than linear interpolation using a different operation in step 184; for example, based on a different interpolation function such as $f(i)+(m*i+c) \bmod(a)$ (or on an interchange of values of adjacent pairs of the existential variables). The processor 2 may apply, in succession, a plurality of different functions for generating sequence of shifted or changed values of the existential variable, to generate a corresponding plurality of different trees in the code store 5. Subsequently, as before, a preferred sequence of code is selected.

Thus, this embodiment permits either the location of a successful iteration function f(i) or a choice between alternative iteration functions.

In a variant of this embodiment, rather than performing the step 184 of calculating a shift value which can be used to generate code which will be susceptible of iteration, the processor 2 calculates a new existential variable value based on the minimum change from the preceding existential variable value (for example, changing only one variable $b_1$ at a time). Code produced in this manner is generally in-line, rather than iterative. However, it will tend to be shorter, and hence faster since a smaller number of assignment statements to change the values of the existential variables will be required.

FOURTH EMBODIMENT

Figure 11:
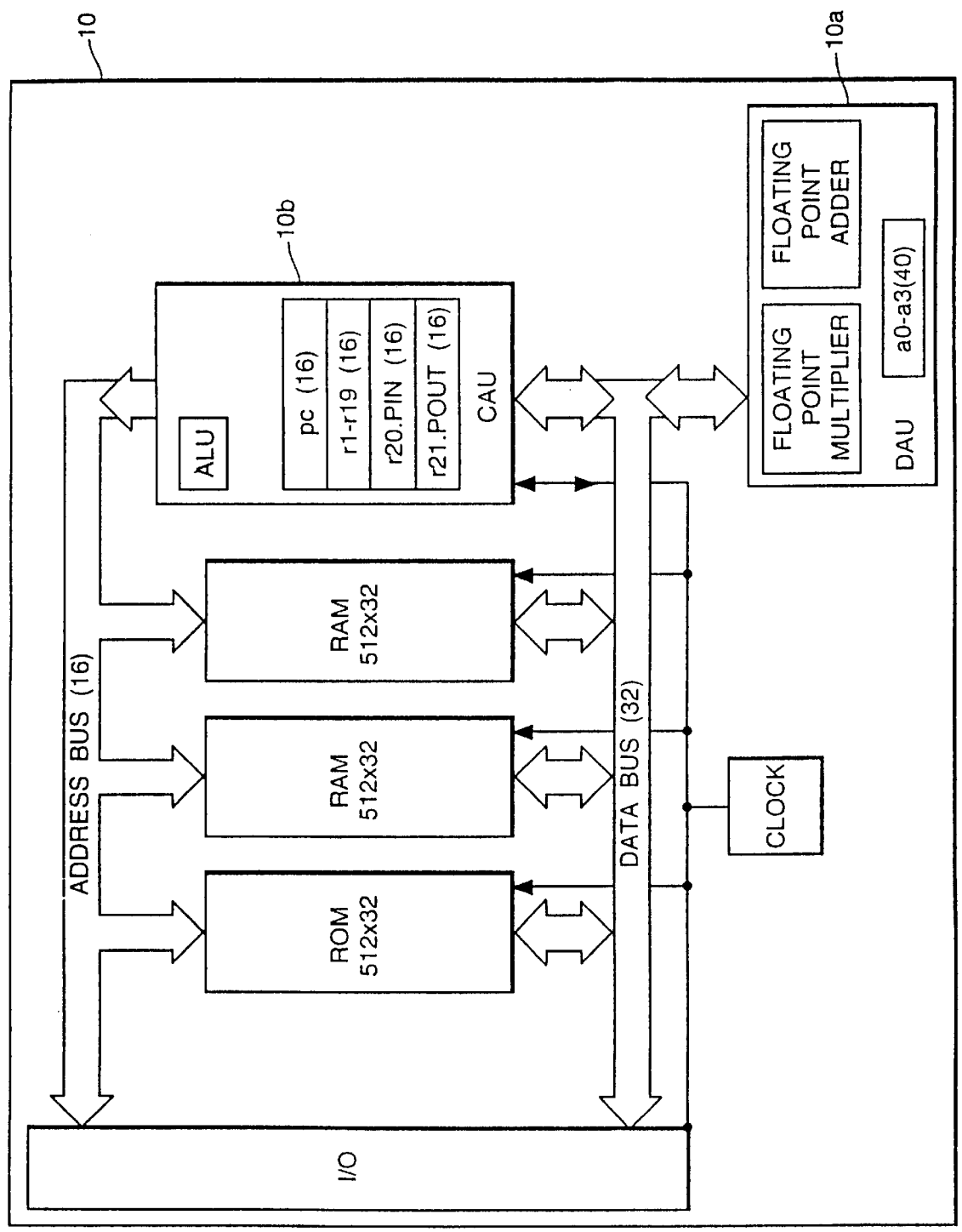
FIG. 11 is a block diagram showing schematically the structure of a known target processor.

Referring to FIG. 11, the target processor 10 in this embodiment comprises a digital signal processing (DSP) device, such as the Western Electric DSP 32 device or other devices in the same family. A detailed description of the DSP 32 will be found in "The DSP 32 digital processor and its application development tools", James R. Boddie et al, AT&T Technical Journal, September/October 1986, Volume 65, Issue 5, pages 89–104 (and the references cited therein); or in "WE DSP32C digital signal processor -information manual" available from AT&T.

Such devices are well known in the art, and hence it is unnecessary and inappropriate for the purposes of the present invention to provide a complete description. Such devices are typically used to process signals at high speed, by performing real time execution of repetition multiplications and additions, typically on arrays, to perform operations such as fast fourier or other discrete digital transforms; finite impulse response or infinite impulse response filters; or the like.

As shown in FIG. 11, together with other standard components the DSP 32 comprises a digital arithmetic unit (DAU) 10a comprising four accumulators ($a_0$–$a_3$), a floating point multiplier and a floating point adder; and a control arithmetic unit (CAU) 10b comprising a programme counter, 21 registers (r1–r21) and an arithmetic logic unit.

The digital arithmetic unit is arranged to perform instructions of the type $a=b+c*d$, where a is one of the accumulators, one of b, c or d is an accumulator, and the others are register or memory i.e. a mathematical deduction is performed upon the two iterative codes to deduce generic iterative code from which the specific code for the 20 member array is derived.

The control arithmetic unit 10b performs some operations on its registers in parallel to the operations of the digital arithmetic unit 10a. Of the 21 registers or the control arithmetic unit 10b, registers 1–14 are used as memory pointers and registers 15–19 are used to hold address increments. A pointer register contains the address of an operand in memory that is to be either read or written, and an increment register contains a number which is added to the pointer to alter it. This addition is done in the ALU, and does not occupy processor time in the DAU. Registers 20 and 21 are of no relevance for the present explanation.

The DSP32C has two indexed addressing modes; normal addressing in which the contents of one of the pointer registers (written *r1) is used as a pointer to the location to be read or written to in memory, which may be modified by the value contained in a pointer register, and post modified addressing, in which the content of the pointer register is incremented by an amount held in the increment register after the pointer register has been used (this is written as, for example, *r1++*r15, where the contents of register 15 will dictate the amount by which register 1 is incremented after the contents of the memory location to which it points have been used). The post increment calculation is done by the ALU within the CAU 10b in parallel with arithmetic calculations on the DAU, and thus post incrementing can be used to set up an iteration loop using a small number of instructions to step through a number of addresses in memory, by placing a post incremented statement within a loop branching back to before the statement.

Figure 12:
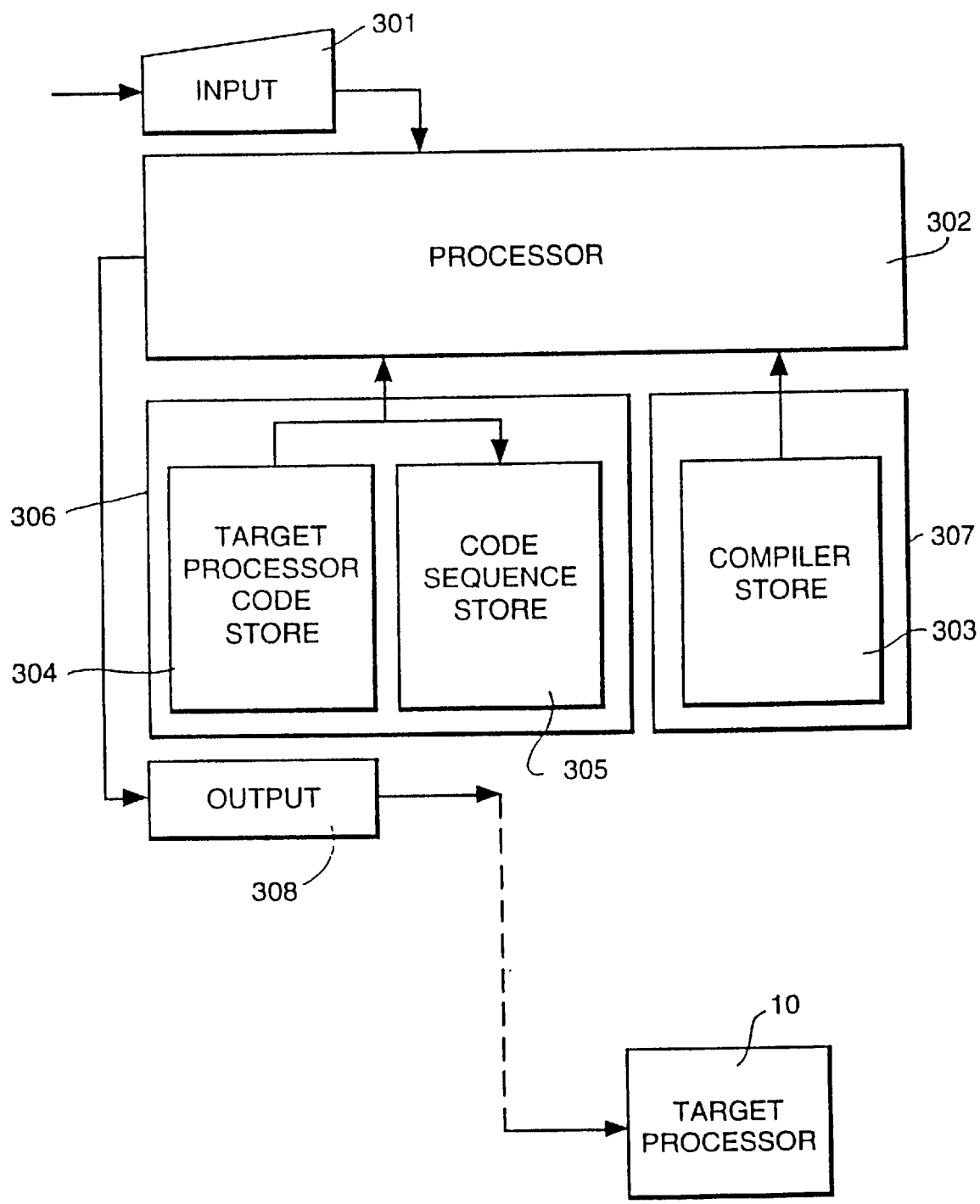
FIG. 12 is a block diagram showing schematically the elements of a device according to a fourth embodiment of the invention and corresponding generally to FIG. 1.

Referring to FIG. 12, in this embodiment the apparatus for deriving code comprises an input device 301 (which might be a keyboard, but could also be a storage device reader such as a disk drive, or even a file receiving data receiving data from another file); a processor 302; a compiler store 303 storing the process to be executed by the processor 302, typically in read only memory (ROM) 307; a code sequence store 305 for storing code generated by the processor 302; a target processor code store 304 for storing details of the instructions set of the target processor 10; the stores 304 and 305 typically being provided as areas within a random access memory (RAM) 306; and an output device 208 for outputting generated code to the target processor 10 (typically in the same manner as the output device 8 discussed above).

An overview of the process of operation performed by the apparatus of FIG. 12 according to the process of FIG. 13 is as follows. The processor 302 allocates one of the registers of the target device 10 to the first occurring variable in the expression. Then, for the next occurring variable, there is a choice as to whether to allocate a register pointer to the address of that variable, or whether to re-use the existing pointer register and add a post modified offset to it to access the second variable.

Figure 14:
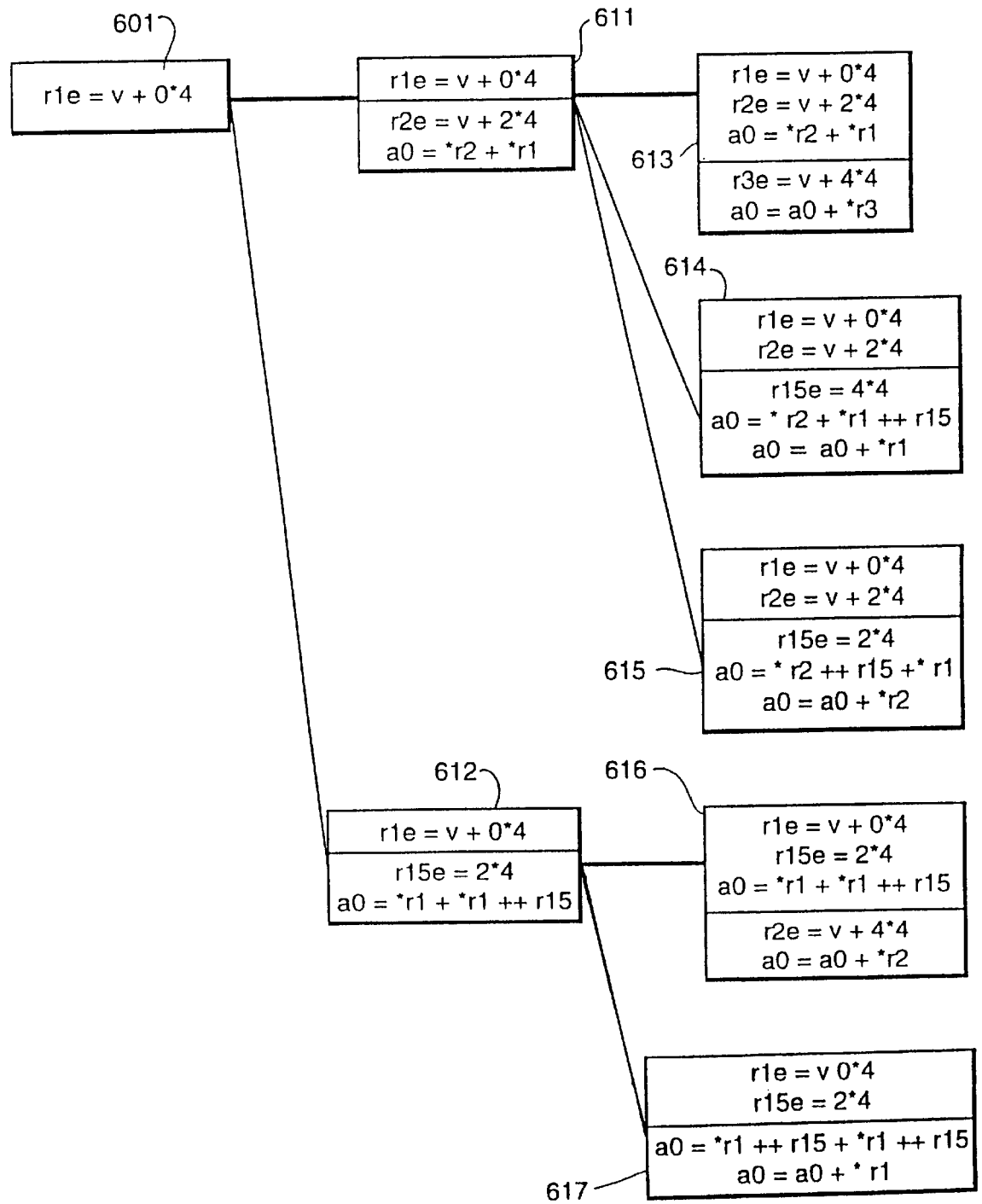
FIG. 14 is a diagram illustrating schematically the contents of the code sequence store of the fourth embodiment in one example.

Accordingly, referring to FIG. 14, the processor 302 creates a tree in the code sequence store 305 with code corresponding to each of these possibilities; as shown, a first node 601 in the store 305 comprises an instruction assigning the value of the address of the first variable v[0] to a first pointer register r1; and, following this first node (and linked thereto by pointers in a similar manner to that shown in FIG. 3) first and second alternative nodes 611, 612, forming the next stages of respective alternative sequences of code. In the node 611, the second variable v[2] is addressed by assigning ts address to a second pointer register r2, allowing the two variables to be added together in the accumulator. In the node 612, on the other hand, the second variable is addressed by assigning an offset (of 8 bytes) to the offset register r15, and then using post modified indexing to access the second variable v[2] in the accumulator statement.

$$a0=*r1+*r1++r15;$$

in other words "take the contents of the memory location pointed to by the contents of register 1 (i.e. v[0]); increment the contents of register 1 to point to the address of v[2] by the contents of register 15; and access the memory location now pointed to by register r1 (i.e. v[2]); and add the two numbers together, storing the result in the accumulator".

Likewise, from each of the nodes 611, 612, there are a number of ways of addressing the third variable v[4]; in node 613, a third register r3 is assigned to point to the address of v[4] and the result is added to the accumulator (which already contains v[0] and v[2]); in node 614, an address offset of 16 bytes (4 words) is allocated to offset register r15, and post modified index addressing is utilised to use the pointer register r1 twice; firstly, to access v[0], which is added to v[2] and stored in the accumulator, r1 then being incremented to point to v[4]; and secondly, to add v[4] to the accumulator.

In node 615, the next already allocated register r2 is utilised, together with the offset register r15, to point to v[4], an offset corresponding to one record (8 bytes) being stored in offset register 15.

In node 616, which follows node 612, a new register r2 is allocated to point to v[4], and in node 617, the existing register r1 is re-used again, together with the existing offset pointer register r15, to access v[4]; the accumulator statements:

$$a0=*r1++r15+*r1+-r15$$

$$a0=a0+*r1;$$

have the effect of accessing v[0]; incrementing r1 to point to v[2]; accessing v[2]; incrementing r1 to point to v[4]; adding v[0] and v[2] and storing the result in the accumulator; accessing v[4]; and adding this to the sum in the accumulator.

In FIG. 14, the code shown at each of the nodes 601–617 comprises, cumulatively, all the code making up the sequence up to, and including, that node. It will be seen, by comparing nodes 613 to 617, that nodes 613–616 each correspond to code 5 instructions long, whereas node 617 corresponds to code comprising only 4 instructions, due to the re-use of registers 1 and 15 together with post indexed addressing.

Having constructed the tree shown in FIG. 14 in the code store 5, the processor 2 then selects the code sequence with the shortest length (in this case, that running from the root node 601 to the terminal node 617).

The process executed by the processor 302 under the control of the compiler stored in the compiler store 303 will now be described in greater detail with reference to FIGS. 13a and 13b in one exemplary embodiment; it will be a realised, however, that many other ways of achieving the equivalent result are available to the skilled person.

Figure 13A:
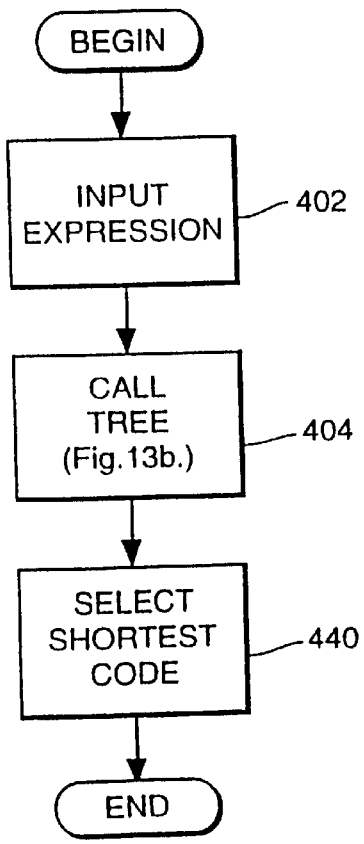
FIG. 13a is a flow diagram showing the operation of the apparatus of FIG. 12 in the fourth embodiment.
Figure 13B:
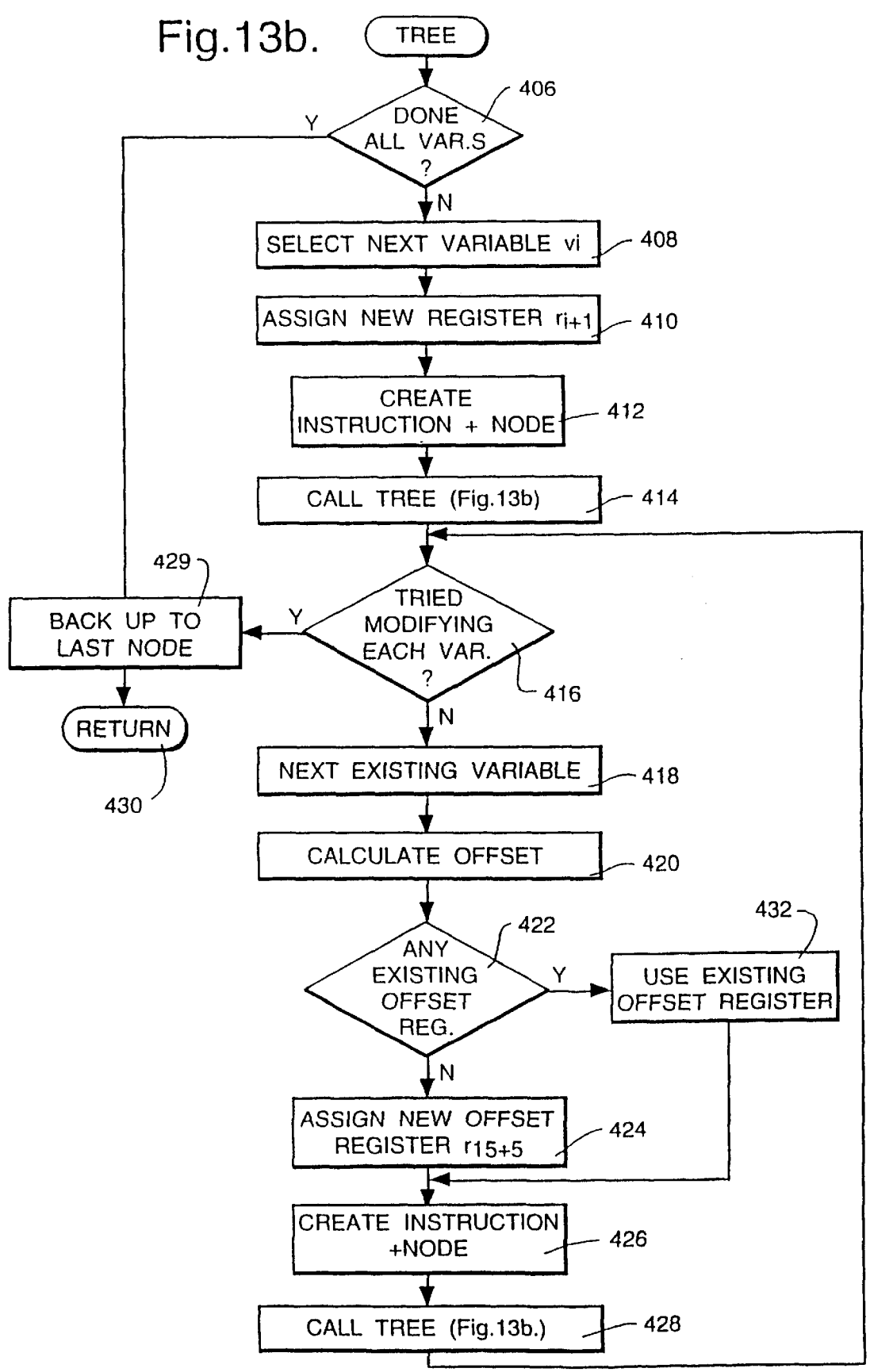
FIG. 13b is a flow diagram showing the operation of a subroutine process called from the process of FIG. 13a to create the contents of the code sequence store.

Referring now to FIG. 13, comprising FIGS. 13a and 13b, operation of this embodiment will be described in greater detail.

The first step 402 is to input the expression to be represented by the code sequence. For example, a simple expression is v[0]+v[2]+v[4]. In this context, this expression will be understood not only to specify the sum of the three matrix elements, but also to specify the order of addition; that is, to specify that v[0] is added to v[2] and the result is added to v[4]. The expression is input via the input means 301. The processor 302 locates the first variable (in this case, v[0] in the expression, and locates, from the target processor code store 306, a first register r1 to which the variable address, in memory, is to be allocated. Since v[0] is an array variable, the address in memory to be loaded into r1 is simply v.

Next, in step 404, the processor 302 calls the tree building routine of FIG. 13b, to construct a tree of possible code sequences in the code sequence store 305.

If there are still unassigned variables (step 406), the next variable in the expression input at the input means 301 is located by the processor 302 (initially the first variable). To create the forward paths shown in thick lines in FIG. 14, a new register r (initially, the first register r1) is assigned in step 410, and an instruction node (e.g. nodes 611, 613 or 616) is created including the assignment instruction and any subsequent arithmetic operation within the expression (e.g. an accumulate add) for which all the variables have now been assigned registers (and are hence available), in step 412.

Next, in step 414, the processor stores all existing variable states and executes a recursive call to the start of the routine of FIG. 13b, commencing once more at step 406. Thus, the processor creates in turn the nodes 601, 611 and 613 of FIG. 14.

Having reached the last variable in the expression to be compiled (i.e. the last node, in this case 613, in one branch of the tree of the code store 5) the processor 302 branches from step 406 to step 429, at which the processor 302 moves back to the preceding node 611 in the tree in the code store 305, and then returns in step 430.

Accordingly, the processor then proceeds to create the nodes 614, 615 by selecting, at each step, one of the already allocated variables held in the registers r1 or r2 for modification; calculating an offset from the existing variable address to the new variable address; determining whether an existing offset register exists storing that offset; (steps 420, 422); and, if not, assigning a new offset register (r15 in this case), in step 424, creating a new instruction node (initially 614 in this example) in step 426 and executing a call (in step 428) to the start of the routine of FIG. 13b.

The effect of this last call is, at this stage, to pass through step 406 to step 429, and thus return to node 611, the processor then executing step 430, and returning to step 416, to modify the next existing variable (register 2 in this example), to create the next alternative code sequence (node 615 in this example) and pass via steps 416–428, 406, 429 and 430 back to step 416.

At this stage, there are no further existing variables (v[0] and v[2] and corresponding registers r1 and r2 having being used to create nodes 614 and 615), and hence control passes to steps 429 and 430, the processor 302 therefore backing up to node 601 in the code store 305. Control then passes back to step 416 and at this stage only the first existing variable has been assigned a pointer register (v[0] and r1 respectively). The loop around step 416 is therefore executed only once, to create node 612, but in this case, on reaching step 428 and calling the start of the routine of FIG. 13b, control passes forward through 406 to step 408 to create node 616, the processor 302 then returning to node 612 and passing forward once more to create node 617, returning again to node 612 and then back to node 601 before exiting the routine of FIG. 13b.

Thus, it will be seen that the effect of the routine of FIG. 13b is to create the code tree (illustrated in FIG. 14) in the code sequence store 305, by moving to the end of each branch of the code tree, then backing up and creating each further branch working from the top left hand corner of FIG. 14.

Having exited FIG. 13b, control returns to step 440 of FIG. 13a, in which the processor 2 searches the code sequence store 305 for the shortest path through the instruction sequence tree (in this case, that from nodes 601 to 617), which is then output via output device 308 to the target processor 10 for subsequent execution thereon.

It is worthy of note that a simple form of the post indexed addressed mode, which increments or decrements a given register by unity, is also available on the DSP 32 processor, and is written as "++" or "--" respectively. In a modification of the process of FIG. 13, a further test is performed around step 432, to determine whether the offset is + or −1, in which case this instruction is used instead of assigning an offset register. This is advantageous in saving one assignment statement.

In the foregoing embodiment, the order of operations is specified in the input received at the input device 301. However, in general, the order of operations may itself be determined, in a first step, by a routine operating according to (for example) the first embodiment of the invention. Alternatively, an algorithm such as the Hu level algorithm (C. Hu, "Parallel Sequencing and Assembly line Problems, Oper. Res. 9, 6 1961, pp 841–848) may be used to determine in which order operations are to be performed.

A solution which is likelier to generate the most efficient code (i.e. the shortest length or fastest code) may be achievable by performing, according to this embodiment, not only the generation of multiple alternative instructions for executing the same sequence of operations (as described above) but generating multiple sequences of operations as well. Thus, in the example of FIG. 14, instead of merely generating multiple different code sequences for performing the same arithmetic operations in the same order on the same input data, further code sequences would be generated starting by adding, for example, v[2] and v[4] prior to adding v[0]. Although in the example of FIG. 14, no benefit would be achieved since the three variables are interchangeable, with more complex mathematical processes the order of performance of operations can make a difference in the efficiency of the code for performing the operations. The modifications to the algorithms of FIG. 13 will be apparent to the skilled person in view of the foregoing embodiments. As with the second and third embodiments, only a subset of the total possible tree may be generated in the code store 305, using simple heuristics to select the paths to be generated to prevent, for example, simple duplication.

It will be apparent that the above embodiments are merely by way of example. In the light of the foregoing, many modifications or alternative embodiments will suggest themselves to the skilled person.

For example, in the first embodiment, rather than searching each possible sequence in the code store 5 and selecting the sequence with the shortest length, it would be possible for the processor 2 to maintain a count during the generating of each sequence within the code store 5, and to reject each new sequence if it is not shorter than a possible sequence already stored. In this manner, the computation time and memory requirements of the store 5 may be reduced.

In the third embodiment, rather than generating in-line code sequences within the code store 5 and then converting these to iterated sequences, it would be relatively straightforward to perform the storage of the sequences directly in the code store 5 as iterated code.

In the third embodiment, when a problem involves an input a[n] of a high number of dimensions, in the second or third embodiments, rather than directly constructing the tree and thereby finding iterated code for a[n], in a modification the apparatus may be arranged to construct first and second trees in the code store 5, for much smaller dimensional problems (e.g. a[2] and a [3]), and then extrapolate the ranges of the iteration indices to find the code sequence for a[n]; in other words, to sort a 20 member array, iterative code for sorting a 2 member array and a 3 member array is derived, and the ranges of the iteration index counters are extrapolated.

The invention could be provided using dedicated programmed logic circuits, or a general purpose processor, or the target processor 10 itself could derive code for its own future use.

Accordingly, the present invention extends to any and all such modifications and variants, and to any and all novel subject matter contained herein, whether or not within the scope of the accompanying claims.

I claim:

1. Apparatus for generating, from an input expression relating a plurality of variables in a predetermined mathematical relationship, a sequence of instruction codes, referred to herein as the execution code, for execution by a programmable processor, the apparatus comprising:

input means (1) arranged to receive an input expression which specifies a mathematical relationship between a plurality of variables;

means (2a) arranged to generate, in response to receipt of a said input expression by said input means, unique sets of variable values postulated as satisfying said mathematical relationship;

means (2b) arranged to respond to the received input expression and to the sets of variable values by testing said sets of variable values to determine whether or not said sets satisfy said mathematical relationship specified by the received input expression and generating an initial set of instruction codes in the form of a decision tree (4) comprising a plurality of linked nodes, each node, other than the root node and the leaf nodes, constituting a decision node of the initial tree, each decision node being generated in response to a respective test of a said set of variable values being determined as being currently unevaluable, and comprising data defining (i) said current set of variable values being tested (506),
(ii) said currently unevaluable test (507),
(iii) a link (508) to a dependent node, the link being associated with an assumed true test result of the currently unevaluable test and being designated a true dependent link, and
(iv) at least one link (509a to 509m) to a respective dependent node, the or each link being associated with an assumed false test result of the currently unevaluable test and being designated a false dependent link, and each leaf node comprising data defining a respective accumulation of the assumed test results associated with the links which extend from the leaf node towards the root node, each respective accumulation satisfying the mathematical relationship specified by the received input expression; and means (2) for forming the execution code by selecting, from the initial tree, a partial tree in which (a) its root node is a dependent node of the root node of the initial tree, and (b) each decision node is linked to only one dependent node by a true dependent link and to only one other dependent node by a false dependent link.

2. Apparatus according to claim 1, arranged to output the execution code as an iterated sequence.

3. Apparatus according to claim 2, in which said testing and generating means (2b) is arranged to generate the execution code as an in-line sequence, and further comprising means (2) for converting a said in-line generated sequence into an iterated sequence.

4. Apparatus according to claim 3, in which said testing and generating means (2b) is arranged to respond to a dimensional value in the input expression by generating a first initial set of instruction codes corresponding to a dimensional value lower than the dimensional value in the input expression, and a second initial set of instruction codes corresponding to a different dimensional value lower than the dimensional value in the input expression, and the converting means is arranged to convert said first and second initial sets of instruction codes into respective first and second iterated sequences and to produce an iterated sequence corresponding to the dimensional value in the input expression by performing mathematical deduction upon said first and second iterated sequences.

5. Apparatus according to claim 3, in which;
said testing and generating means is arranged to generate said decision tree with a plurality of nodes directly dependent from its root node,
the selecting means is arranged to provide to the converting means a plurality of said partial trees,
the converting means is arranged to convert said plurality of said partial trees into respective iterated sequences, and the selecting means is further arranged to perform the selection of said partial tree by choosing one of said converted sequences in accordance with a predetermined criterion.

6. Apparatus according to claim 5, in which said predetermined criterion is the converted sequence having the fewest instructions.

7. Apparatus according to claim 1, in which the selecting means is arranged to determine the quantity of instructions in each of a plurality of partial trees and to select the partial tree on the basis of fewest instructions.

8. Apparatus according to claim 1, in which said testing and generating means is arranged to cease generating instruction codes when the number of nodes depending from the root node of the initial tree reaches a predetermined value.

9. Apparatus according to claim 1, in which said testing and generating means is arranged to respond to the creation of a dependent decision node linked by a false dependent link by determining the difference between its associated variable values and the variable values associated with the decision node from which it depends, and modifying the sequence of the generated variable values in accordance with a predetermined function of said difference.

10. Apparatus according to claim 9, in which said predetermined function is a regular progression.

11. A compiler arranged to utilise a specification of a function to be compiled which comprises a definition of the result thereof, and to generate a plurality of proposed solutions for said definition and to apply an inference engine to each said solution in turn, and when the correctness of a solution cannot be evaluated by the inference engine, to create a decision node having a plurality of branches therefrom leading to respective dependent nodes of a decision tree, one of the branches corresponding to a true determination of the decision at execution of said compiled code, and the or each other of the branches corresponding to a false determination of the decision at execution of said compiled code, at least some said nodes having a plurality of said branches corresponding to a false determination of the decision at execution of said compiled code, only one of which latter plurality of branches is used in said compiled code and the remainder of said latter plurality of branches being redundant.

12. Apparatus according to claim 11 arranged to accept said specification in the form of a testable logical relationship which is satisfied when the function is performed.

13. Apparatus according to claim 12 in which said relationship is in the form of a predicate calculus expression.

14. Apparatus according to claim 12 or claim 13 which is arranged to generate a sequence of variable values representing the inputs to said relationship; to test whether said relationship is met for each generated variable value; and, in the event that the relationship cannot be evaluated, to store data defining a logical test instruction corresponding to the unevaluable portion of said relationship, for subsequent execution by said programmable processor, and data defining a change in said variable values.

15. Apparatus according to claim 14, in which the change in said variable values is generated to correspond to a regular progression which may be replaced with an iterative sequence.

16. Apparatus according to claim 14 in which said changes are arranged so as to minimise the number of assignment statements required by said programmable processor to implement said changes.

* * * * *